(12) United States Patent (10) Patent No.: US 8,213,298 B2
Yamaguchi et al. (45) Date of Patent: *Jul. 3, 2012

(54) BEST PATH SELECTING DEVICE, BEST PATH SELECTING METHOD, AND PROGRAM

(75) Inventors: Takao Yamaguchi, Osaka (JP); Atsushi Yoshida, Osaka (JP); Tomoki Ishii, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/994,287

(22) PCT Filed: Mar. 10, 2010

(86) PCT No.: PCT/JP2010/001686
§ 371 (c)(1),
(2), (4) Date: Nov. 23, 2010

(87) PCT Pub. No.: WO2010/103818
PCT Pub. Date: Sep. 16, 2010

(65) Prior Publication Data
US 2011/0069612 A1    Mar. 24, 2011

(30) Foreign Application Priority Data
Mar. 12, 2009    (JP) ................................. 2009-059519

(51) Int. Cl.
*G01R 31/08* (2006.01)
(52) U.S. Cl. .......................... 370/217; 370/221; 370/237
(58) Field of Classification Search .......... 370/217–221, 370/237
See application file for complete search history.

(56) References Cited

U.S. PATENT DOCUMENTS

| 5,959,995 A | 9/1999 | Wicki et al. |
| 8,014,290 B2* | 9/2011 | Ji .................................. 370/237 |
| 2005/0099983 A1 | 5/2005 | Nakamura et al. |

(Continued)

FOREIGN PATENT DOCUMENTS

JP    2000-92124    3/2000

(Continued)

OTHER PUBLICATIONS

International Search Report issued Jun. 15, 2010 in International (PCT) Application No. PCT/JP2010/001686.

*Primary Examiner* — Anh-Vu H Ly
*Assistant Examiner* — Peter Cheng
(74) *Attorney, Agent, or Firm* — Wenderoth, Lind & Ponack, L.L.P.

(57) ABSTRACT

A path selecting device of a bus master (300) includes a path information generating unit (302) generating path information indicating paths from the bus master (300) to a bus master (400), and including a path malfunction predicting unit (303) predicting a malfunction on each of NoC routers, using a number of flows as a scale for an occurrence of a malfunction on the respective NoC router, at least one of which is determined for each path indicated by the path information. The bus master (300) also includes a bypass path selecting unit (304) selecting, when the malfunction is predicted on an NoC router that is a candidate for monitoring, a path that should be used for transmitting the data from the bus master (300) to the bus master (400), from the paths indicated by the path information except the path including the NoC router on which the malfunction is predicted.

12 Claims, 29 Drawing Sheets

U.S. PATENT DOCUMENTS

| | | | |
|---|---|---|---|
| 2010/0002589 A1* | 1/2010 | Ciordas et al. | 370/241 |
| 2010/0027424 A1* | 2/2010 | Radunovic et al. | 370/238 |
| 2010/0287238 A1* | 11/2010 | Setton et al. | 709/204 |
| 2011/0032818 A1* | 2/2011 | Yamaguchi et al. | 370/225 |

FOREIGN PATENT DOCUMENTS

| | | |
|---|---|---|
| JP | 2001-94597 | 4/2001 |
| JP | 2001-136178 | 5/2001 |
| JP | 2005-143001 | 6/2005 |
| JP | 2005-347879 | 12/2005 |
| JP | 2006-13926 | 1/2006 |
| JP | 2006-50442 | 2/2006 |
| JP | 3816531 | 8/2006 |
| JP | 2008-118242 | 5/2008 |
| JP | 2008-211690 | 9/2008 |
| WO | 2008/004188 | 1/2008 |

* cited by examiner

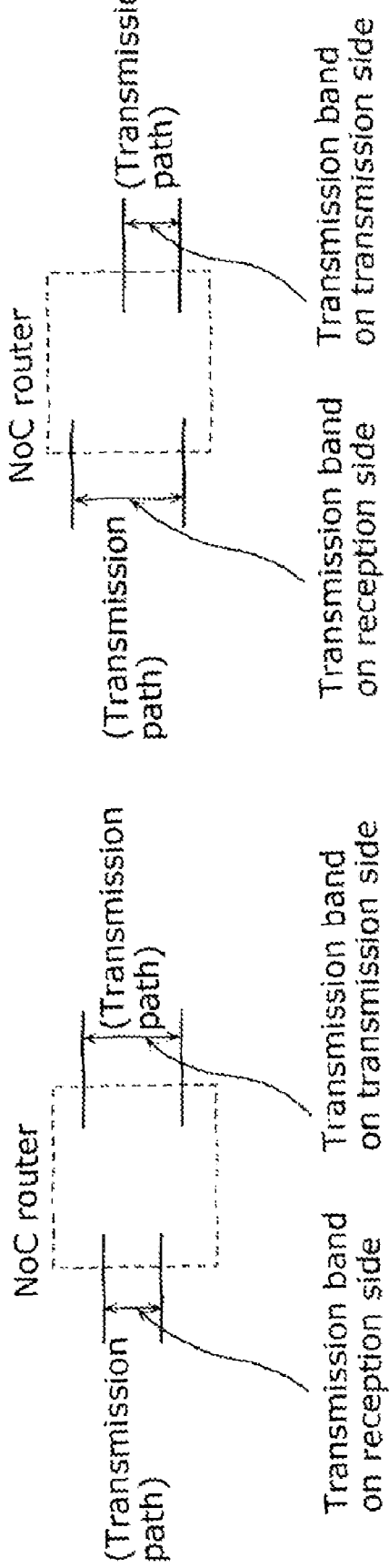

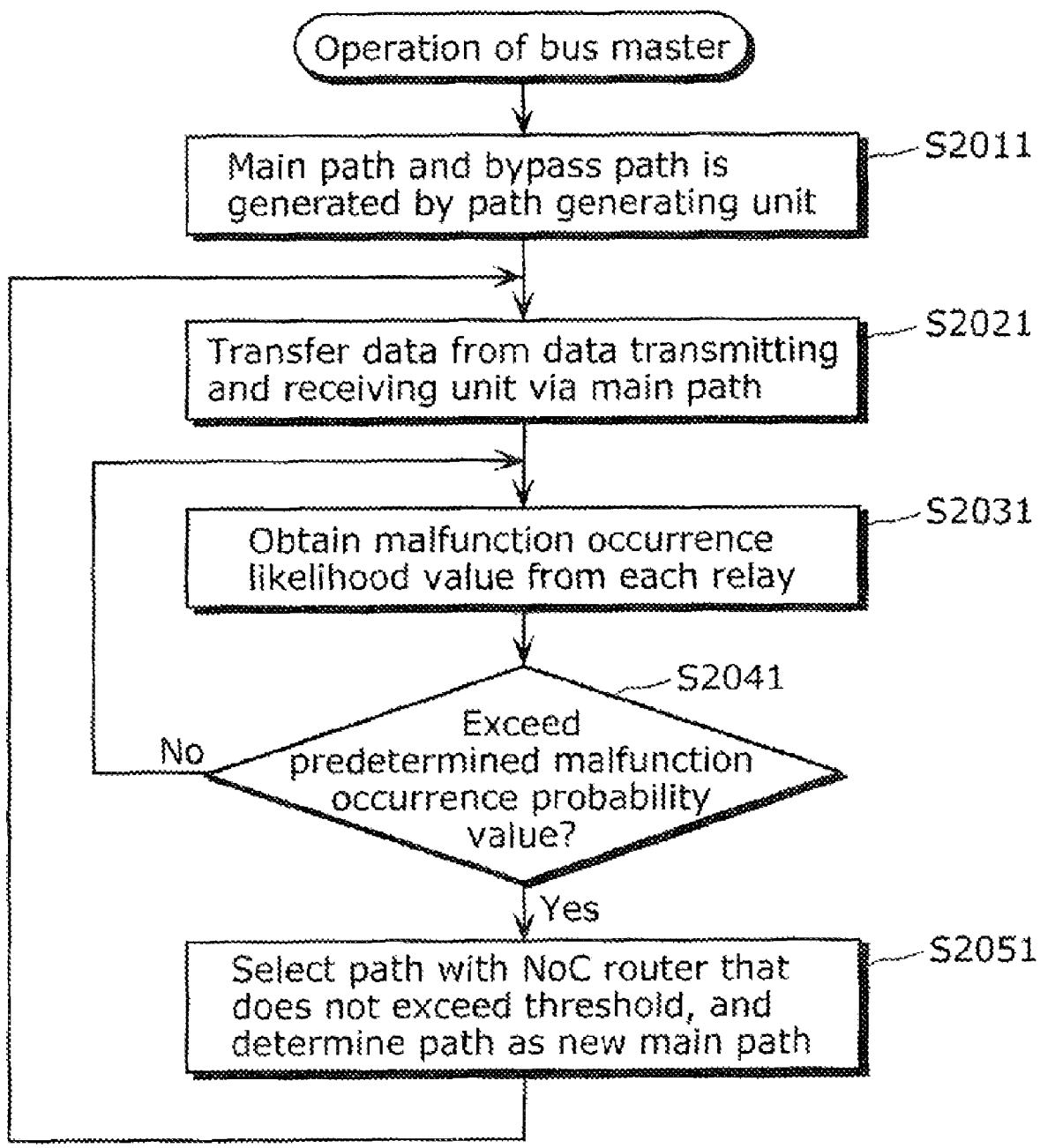

| Identification number | Address of transmission source | Port number of transmission source | Address of destination | Port number of destination | Update time |
|---|---|---|---|---|---|
| 1 | A | 1000 | B | 2000 | T1 |
| 2 | C | 3000 | D | 4000 | T2 |
| 3 | C | 5000 | D | 6000 | T3 |

FIG. 18

| NoC router identification number | NoC router address | Malfunction occurrence probability value |
|---|---|---|
| 1 | fd00::21 | 5 |
| 2 | fd00::22 | 5 |
| 3 | fd00::23 | 5 |
| 4 | fd00::24 | 50 |

FIG. 19

| NoC router identification number | NoC router address | Monitoring frequency |
|---|---|---|
| 1 | fd00::21 | 0.87 |
| 2 | fd00::22 | 0.21 |
| 3 | fd00::23 | 0.65 |
| 4 | fd00::24 | 0.90 |

FIG. 23

| NoC router identification number | NoC router address | Normalized monitoring frequency |
|---|---|---|
| 1 | fd00::21 | 0.34 |
| 2 | fd00::22 | 0.09 |
| 3 | fd00::23 | 0.24 |
| 4 | fd00::24 | 0.33 |

BEST PATH SELECTING DEVICE, BEST PATH SELECTING METHOD, AND PROGRAM

TECHNICAL FIELD

The present invention relates to a best path selecting device in a semiconductor system network in which multiple transmission paths are available, a best path selecting method, and a program.

BACKGROUND ART

Conventionally, research and development have been done on Network-on-Chip (NoC) which is an approach for solving the difficulty in designing bus that allows expansion in the scale of the semiconductor device, using the network technology between the processors or the bus masters. Instead of conventional crossbar switch that intensively controls the processors and bus masters, the bus is networked by mutually connecting the chips and the bus masters through a NoC router (router). This facilitates adding or deleting functions in the semiconductor system, and allows the traffic to be dispersed. However, the control is dispersed as well, which makes the control more complex. In order to address this problem, implementing the scheme which automatically optimizes the traffic control increases the efficiency in bus to the maximum extent. This lowers the operation clock of the bus and reduces unnecessary processing, thereby attempting to lower power consumption. Furthermore, autonomous and harmonious increase of the use efficiency of the bus by the semiconductor device itself allows reducing the workload on the semiconductor device developer when developing the semiconductor device. Challenges in controlling the traffic in the bus stems from the change in traffic is due to switch in content to be processed, user operations, and processing methods. In order to avoid the challenge due to the traffic change, the lowest value is used in simulation for the current semiconductor devices. This lowers the use efficiency of the bus, making it difficult to reduce the consumption power of the semiconductor device. In addition, estimating the lowest value is not an easy task. This problem is even more serious in the NoC with the dispersed bus. The present invention reduces the consumption power and reduces the workload on the semiconductor device developer at the time of development, by automatically optimizing the traffic control of the bus, lowering the operation clock of the bus, and newly providing a function for reducing the unnecessary process. Dispersing the bus is one of the methods for increasing the use efficiency of the bus. This creates multiple paths for the destination bus master (the components of the semiconductor device such as, Digital Signal Processor (DSP), processor, IO, memory, and others). The present invention is for a method for selecting a high transmission quality bus, and switching the paths for optimizing the traffic control.

Patent Literature 1 discloses a technology for continuing the transmission when a transmission error occurs and there is no response to the error by newly selecting a path.

[Citation List]
[Patent Literature]
[Patent Literature 1] Japanese patent No. 3816531

SUMMARY OF THE INVENTION

Technical Problem

However, with the conventional technology, there is a first problem that the path cannot be quickly switched at the time of malfunction; that is, when the transmission quality on the path used for transmitting data degrades or when the malfunction which increases the load on the path occurs. The problem arises because the malfunction is detected after occurring, using the path information such as the number of retries.

Furthermore, there is the second problem that no method that is suitable for collecting the path information with small resource (for example, communication amount, consumption power, required time) and that allows timely detection of malfunction.

For example, according to a method that simply does not collect the path information indicating malfunction that does not reach a predetermined threshold in order to limit the resource, the effect on limiting the resource and a risk for overlooking the malfunction depending on a threshold contradicts each other. As a result, it is difficult to find a suitable threshold.

The present invention has been conceived in view of these problems, and it is a first object to provide a path control technology that allows quick path switching on an NoC.

A second object is to provide a path control technology that limits resources necessary for collecting the path information, and avoids overlooking possible malfunctions.

Solution to Problem

In order to achieve the abovementioned object, the best path selecting device according to an aspect of the present invention is a best path selecting device which selects a path for transmitting data from a transmission bus master to a reception bus master through NoC (Network-on-Chip) routers, the best path selecting device including: a path information generating unit which generates path information indicating paths for transmitting the data from the transmission bus master to the reception bus master; a path malfunction predicting unit which predicts a malfunction on each of the NoC routers, using the number of flows as a scale for occurrence of a malfunction on the NoC router, each of the flows being a sequence of one or more flits to be transmitted from a same transmission source to a same destination by the NoC router which is a candidate for monitoring, at least one of which is determined for each path indicated by the path information; and a bypass path selecting unit which selects, when the malfunction is predicted on the at least one NoC router that is the candidate for monitoring on one of the paths, a path that should be used for transmitting the data from the transmission bus master to the reception bus master, from the paths indicated by the path information except the path including the NoC router on which the malfunction is predicted.

Furthermore, the path malfunction predicting unit may predict the malfunction on the NoC router by using, as the scale for occurrence of the malfunction on the NoC router, the number of flow relayed by each of the NoC routers except the flow from the transmission bus master to the reception bus master.

Furthermore, the path malfunction predicting unit may predict the malfunction on the NoC router by using, as the scale for occurrence of the malfunction on the NoC router, the number of flows each of which is with a transmission band on a network for transmission narrower than a transmission band on a communication line for reception, among the flows relayed by each of the NoC routers.

Furthermore, the path malfunction predicting unit may include: a monitoring frequency value storage unit which stores a monitoring frequency value indicating a frequency for monitoring a malfunction occurrence probability value of each of the NoC routers that is the candidate for monitoring, the malfunction occurrence probability value indicating a probability of the malfunction on the NoC router including a degradation in transmission quality and increased load; a selection probability value generating unit which generates a selection probability value which is a predetermined probability value for each of the NoC routers; a monitoring object selecting unit which selects, from the NoC routers, an NoC router a malfunction occurrence probability of which is to be monitored, according to the monitoring frequency value and the selection probability value; a malfunction occurrence probability value obtaining unit which obtains the malfunction occurrence probability value from the NoC router selected by the monitoring object selecting unit; a malfunction occurrence probability value storage unit which stores the obtained malfunction occurrence probability value; an activation level calculating unit which calculates, using the stored malfunction occurrence probability value, an activation level indicating validity of the monitoring frequency value stored in the monitoring frequency value storage unit; and a monitoring frequency value updating unit which updates the monitoring frequency value stored in the monitoring frequency value storage unit, based on the activation level.

Furthermore, the bypass path selecting unit may determine a transmission quality value indicating transmission quality of each of the NoC routers that is the candidate for monitoring, and may select a path that should be used for transmitting the data from the transmission bus master to the reception bus master, from paths further excluding a path including a NoC router with transmission quality below a predetermined standard, the transmission quality being indicated by the determined transmission quality value.

Furthermore, the bypass path selecting unit may collect a load value indicating a level of load on a NoC router, from each of the NoC routers that is the candidate for monitoring, and may select a path that should be used for transmitting the data from the transmission bus master to the reception bus master, from paths further excluding a path including a NoC router with a level of load smaller than a predetermined standard, the level of load being indicated by the collected load value.

Furthermore, when the malfunction is predicted in at least one NoC router which is the candidate for monitoring, the bypass path selecting unit may obtain malfunction size information indicating a size of malfunction occurring around the NoC router on which the malfunction is predicted, and may not exclude, from selection of the path for transmitting the data from the transmission bus master to the reception bus master, a path including an NoC router with the size of malfunction indicated by the obtained malfunction size information smaller than a predetermined standard.

Furthermore, the best path selecting device may be provided on the transmission bus master or one of the NoC routers included in a semiconductor system.

The best path selecting device according to another aspect of the present invention is a best path selecting device which controls a path for transmitting data from a transmission bus master to a reception bus master through NoC routers, in which each of the NoC routers includes a path malfunction detecting unit which calculates the number of flows each of which is a sequence of one or more flits to be transmitted from a same transmission source to a same destination as a malfunction occurrence probability value indicating a scale for probability of a malfunction on the NoC router, and to notify the best path selecting device of the malfunction occurrence probability value when the malfunction occurrence probability value exceeds a predetermined threshold, the best path selecting device includes: a path information generating unit which generates path information indicating paths for transmitting the data from the transmission bus master to the reception bus master; and a bypass path selecting unit which selects, when the malfunction is predicted on the at least one NoC router, a path that should be used for transmitting the data from the transmission bus master to the reception bus master, from the paths indicated by the path information except the path including the NoC router on which the malfunction is predicted.

Note that the present invention may not only be implemented as the best path selecting device including these characteristic processing units, but also as a best path selecting method including the characteristic processing units in the best path selecting device as steps. In addition, the present invention may be implemented as a program which causes a computer to execute the characteristic steps included in the best path selecting method. Needless to say, such a program may be distributed via a nonvolatile recording medium such as Compact Disc-Read Only Memory (CD-ROM) and a communication network such as the Internet.

Advantageous Effects of Invention

As described above, according to the best path selecting device of the present invention, malfunction on an NoC router is predicted using the number of flows to be relayed at the NoC router as a malfunction occurrence probability value, and a path that should be used for transmitting the data is newly selected, excluding a path including the NoC router on which the malfunction is predicted.

With this, it is possible to perform quick bypassing before the degradation on the transmission quality or the increase on the load that would be reflected on the predetermined statistics actually occurs.

In addition, the malfunction occurrence probability value is collected from the NoC router stochastically selected according to the monitoring frequency corresponding to the probability of the malfunction and the collected malfunction occurrence probability value is used for predicting the malfunction.

This limits the cost for monitoring (the amount of monitoring flit, consumption power, and time required for observation), and stochastically avoids overlooking malfunction.

Furthermore, when the traffic change frequently occurs, the path is frequently switched. Thus, the invention is even more effective, significantly improving the transmission quality in particular.

BRIEF DESCRIPTION OF DRAWINGS

FIG. 4A illustrates transmission bandgap in flow.
FIG. 4B illustrates transmission bandgap in flow.

FIG. 10 is a flowchart illustrating another exemplary operation of bus master.

FIG. 18 illustrates an example of data structure of the malfunction occurrence probability value table.

FIG. 19 illustrates an example of data structure of the monitoring frequency value table.

FIG. 23 illustrates an example of the data structure of the normalized monitoring frequency value table.

DESCRIPTION OF EMBODIMENTS

The following describes the best path selecting device and the best path selecting method according to the embodiment of the present invention with reference to the drawings.

(Overview of Path Control)

Figure 1:
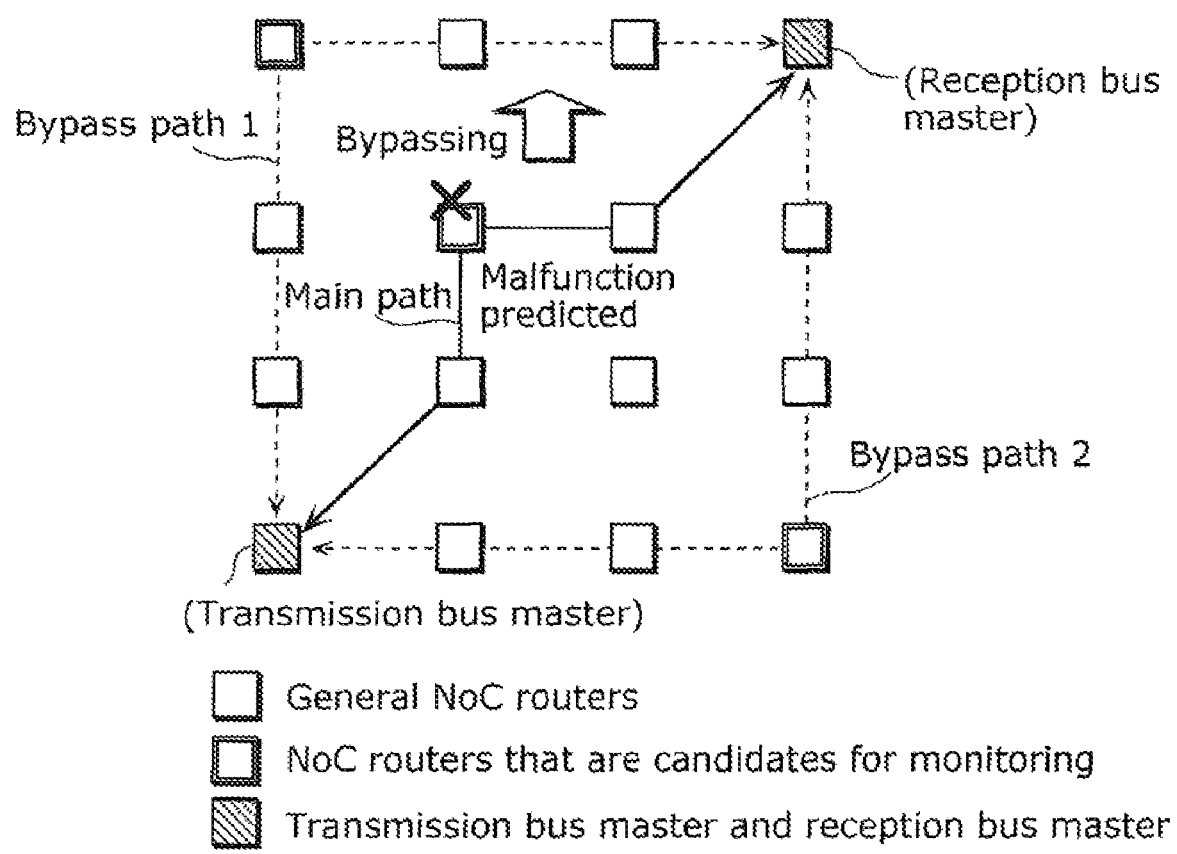
FIG. 1 schematically illustrates an example of NoC in which the transmission path is controlled according to the best path selection method according to the present invention.

FIG. 1 schematically illustrates an example of NoC in which the transmission path is controlled according to the best path selection method according to the present invention. As a communication scheme of the NoC, the transmission slot with a predetermined time length may be provided, and the information to be transmitted is transmitted synchronized or not synchronized with the transmission slot. Furthermore, no flit is discarded in the NoC router, and the flit is held until the transmission is possible. In addition, the flow control may be introduced to adjust an interval between flits to be transmitted. Note that, the units of data to be transmitted are referred to as packets or flits in the present invention.

When processing the data using packets, the data length to be transmitted in general is variable. When processing the data using packets, a data sequence to be transmitted is divided into one or more packets by a bus master which performs transmission, so that the packet is equal to or less than the predetermined data length. The relay composes buffers for transmission and reception using the predetermined maximum data length as a storage unit for one packet. In the case of packets, the actual divided data length is described in the header of the packet so that the length of the packet can be seen. On the reception side, the data length described in the header is referred, the amount of read packet is adjusted, the position of the header of the each packet is located, the header of each packet is removed, and the data sequence is reconstructed from one or more packets.

When processing data using flits, the data length to be transmitted is fixed in order to facilitate the hardware process. When processing data using the flits, the data sequence to be transmitted is divided into one or more flits at a bus master which transmits the data in a predetermined fixed length size. The relay composes buffers for transmission and reception using the predetermined fixed data length as a storage unit for one flit.

On the reception side, each flit is read at a fixed data length, the header is removed, and the data sequence is reconstructed from the flits.

Figure 2:
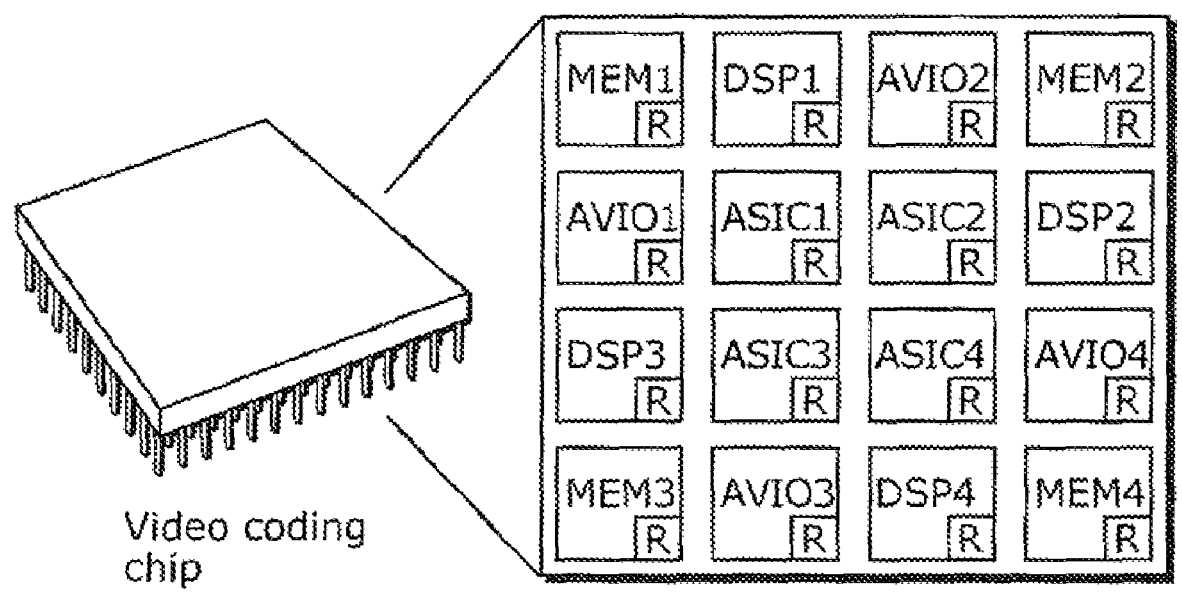
FIG. 2 illustrates an example of the video coding device configured with NoC.

FIG. 2 schematically illustrates an example in which the video coding device is composed by an NoC. The chip includes multiple bus masters inside, and each bus master is connected to the NoC routers. The bus masters are functional components necessary for video coding such as DSP, processor, IO, and memory. The NoC router includes memories inside for each destination, and temporarily stores the received data in a corresponding memory, and transfers the flits to the NoC router which is the destination, based on the path table. Here, the description is made using the video coding chip as an example. However, the application of the invention is not limited to this example, but may be used for an application in which the entire System-on-Chip (SoC) is composed of the NoCs.

FIG. 1 illustrates, for example, three paths from the transmission bus master to the reception bus master (one main path and two bypass paths) in a semiconductor system which is made up by mutually connecting NoC routers through communication lines. Each path includes at least one NoC router which is a candidate for monitoring.

The main path indicates the path currently used, and the bypass paths indicate standby paths.

In the NoC illustrated in FIG. 1, when the malfunction of the NoC router being monitored is predicted, and a new path to be used for transmitting data from the transmission bus master to the reception bus master is selected from among the paths except the path including the NoC router malfunction of which is predicted. Typically, when the malfunction of the NoC router on the main path is predicted, one of the bypass paths is selected as a new main path. The criteria for selecting the path shall be described in detail later.

The malfunction refers to a case where the NoC router's communication status falls out of the preferable communication status (degradation in transmission quality and increase in load are included, for example). Detecting a status where the malfunction is likely to occur is referred to as predicting the malfunction.

In the present invention, the number of flows relayed by the NoC router is used for predicting malfunction, as the malfunction occurrence probability value indicating the probability of the malfunction, instead of the statistic reflecting the actual malfunction, such as the retry count, the value indicating load on the line, or amount of traffic that is conventionally used for detecting malfunction.

The flow refers to one or more sequences of flits to be transmitted from one transmission source to one destination.

What kind of flow count is counted as the malfunction occurrence probability value shall be described in detail later.

The malfunction occurrence probability value is collected periodically from the NoC router selected as the object to be monitored among the candidates for monitoring, according to a predetermined monitoring frequency. The monitoring frequency is determined, using the malfunction occurrence probability value that has already collected, such that the more likely malfunction occurs in an NoC router, the higher the monitoring frequency, while an NoC router with low malfunction possibility is to be selected less frequently. The NoC router to be selected as the monitoring object is stochastically selected by adding the selection probability value to the monitoring frequency.

According to the path control performed as described above, the predetermined number of flows is used as the malfunction occurrence probability value to predict malfunctions. Thus, it is possible to predict the malfunction on the main path and switches the path to the bypass path, before the transmission quality actually degrades or the load increases, which are reflected on the predetermined statistics.

In addition, the malfunction occurrence probability value is collected from the NoC router that is stochastically selected by adding the selection probability value to the monitoring frequency according to the probability of the malfunction, and the collected malfunction occurrence probability value is used for predicting malfunction. As a result, it is possible to limit the cost for monitoring (amount of monitoring flits, consumption power, time required for observation), and avoid overlooking the malfunction stochastically.

(Definitions of the Intersecting Flow Count and Transmission Bandgap Count)

The intersecting flow count and the transmission bandgap count are defined as examples of the malfunction occurrence probability value. As described above, the malfunction occurrence probability value is the number of flows relayed by the NoC router, and indicates the probability of malfunction in the NoC router.

First, the definition of the intersecting flow count shall be described.

FIG. 3A to FIG. 3D illustrate intersecting flows.

As described above, the flow refers to one or more sequences of flits to be transmitted from the same transmission bus master to the same reception bus master. In other words, a sequence of one or more flits with the same address and the port number of the transmission source and with the same address and port number of the destination is considered to be one flow.

When the NoC router relays multiple flows, one flow is defined as a focused flow. On the other hand, a flow with at least one of an address and a port number of the transmission source and an address and a port number of the destination different from those of the focused flow is defined as a flow intersecting the focused flow.

Figure 3B:
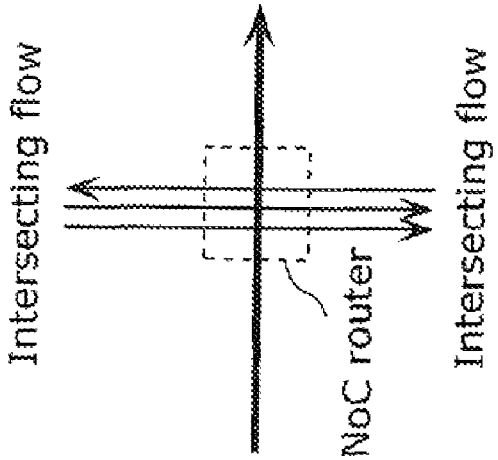
FIG. 3B illustrates intersecting flows.
Figure 3D:
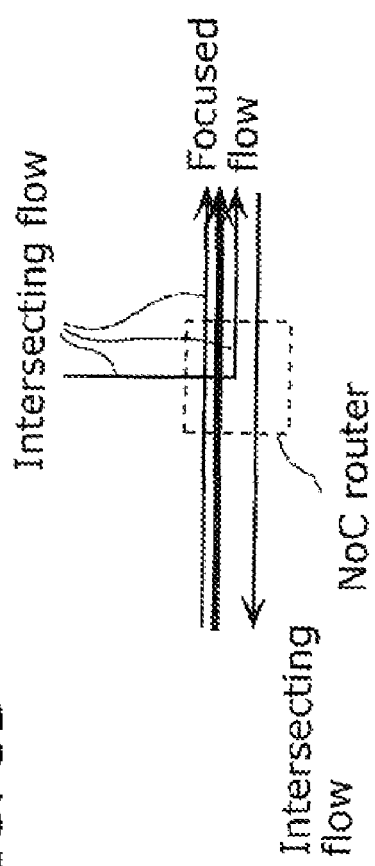
FIG. 3D illustrates intersecting flows.
Figure 3A:
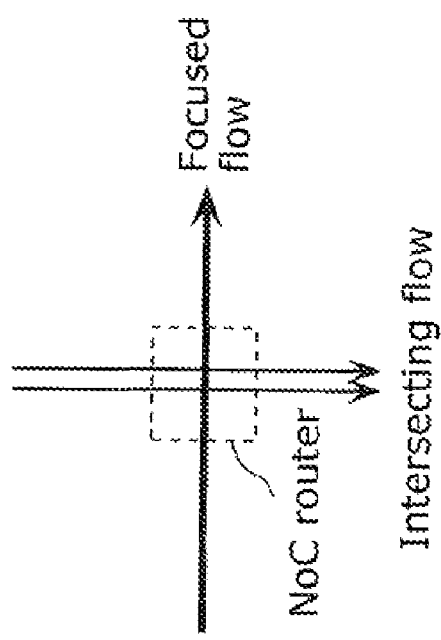
FIG. 3A illustrates intersecting flows.

FIG. 3A schematically illustrates two intersecting flows with both address of the transmission source and the address of the destination different from those of the focused flow.

Note that, the difference in the address is represented in the diagram as the difference in the direction from the NoC router.

FIG. 3B schematically illustrates three intersecting flows with both address of the transmission source and the address of the destination different from the focused flow.

Figure 3C:
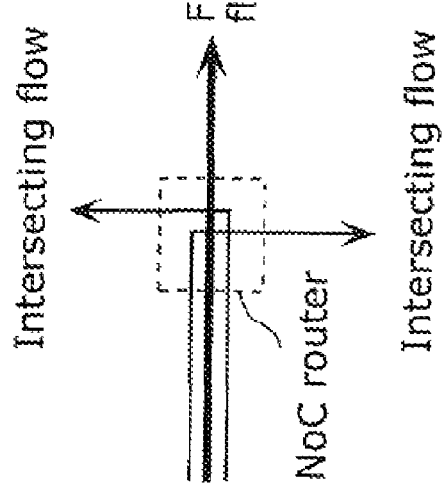
FIG. 3C illustrates intersecting flows.

FIG. 3C schematically illustrates two intersecting flows with the same address of the transmission source as the focused flow and different address of the destination.

FIG. 3D schematically illustrates three patterns of flows intersecting the focused flow. The first intersecting flow is with the address of the transmission source different from that of the focused flow and address identical to that of the destination. The second intersecting flow is with the address of the transmission source and the address of the destination opposite from the focused flow. The third intersecting flow is with the addresses identical to that of the transmission source and the destination as the focused flow, but with at least one of the port numbers of the transmission source and the destination different from those of the focused flow.

In the present invention, the flow flowing from the transmission bus master to the reception bus master is defined as the focused flow, and the number of flows intersecting the focused flow at each NoC router is defined as the intersecting flow count.

The larger the intersecting flow count, the more likely the traffic to be relayed at the NoC router increases and the more likely the room for stability in response to the change in the amount of traffic (such as the change in content, operations by user, switching schemes) decreases.

Thus, it is determined that the malfunction at the NoC router is more likely to occur.

Next, the definition of transmission bandgap count shall be described.

FIG. 4A and FIG. 4B illustrate the transmission bandgap that occurs in the flow.

A bus of certain type of semiconductor system gradually changes the operation clock for saving power. Regarding one flow relayed by the NoC router, the transmission bands of the links on the reception side and the transmission side independently vary in general. In addition, in a system LSI in general, buses at various speeds are stored in the NoC router. Thus, the transmission bandgap occurs even at the time of design.

FIG. 4A schematically illustrates a case where the transmission band of the link on the transmission side is larger than the transmission band of the link on the reception side FIG. 4B schematically illustrates a case where the transmission band of the link on the transmission side is smaller than the transmission band of the link on the reception side.

In the present invention, the case where the transmission band of the link on the transmission side of the flow is smaller than the transmission band of the link of the reception side of the flow is defined as the case where the transmission bandgap occurs. Furthermore, the number of flows with the transmission bandgap in the NoC router is defined as the transmission bandgap count.

The larger the transmission bandgap count, the more likely the flits staying in the buffer of the NoC router increases. Thus, it is determined that the malfunction on the NoC router is more likely to occur.

(Configuration of Semiconductor System Including Best Path Selecting Device)

Figure 5:
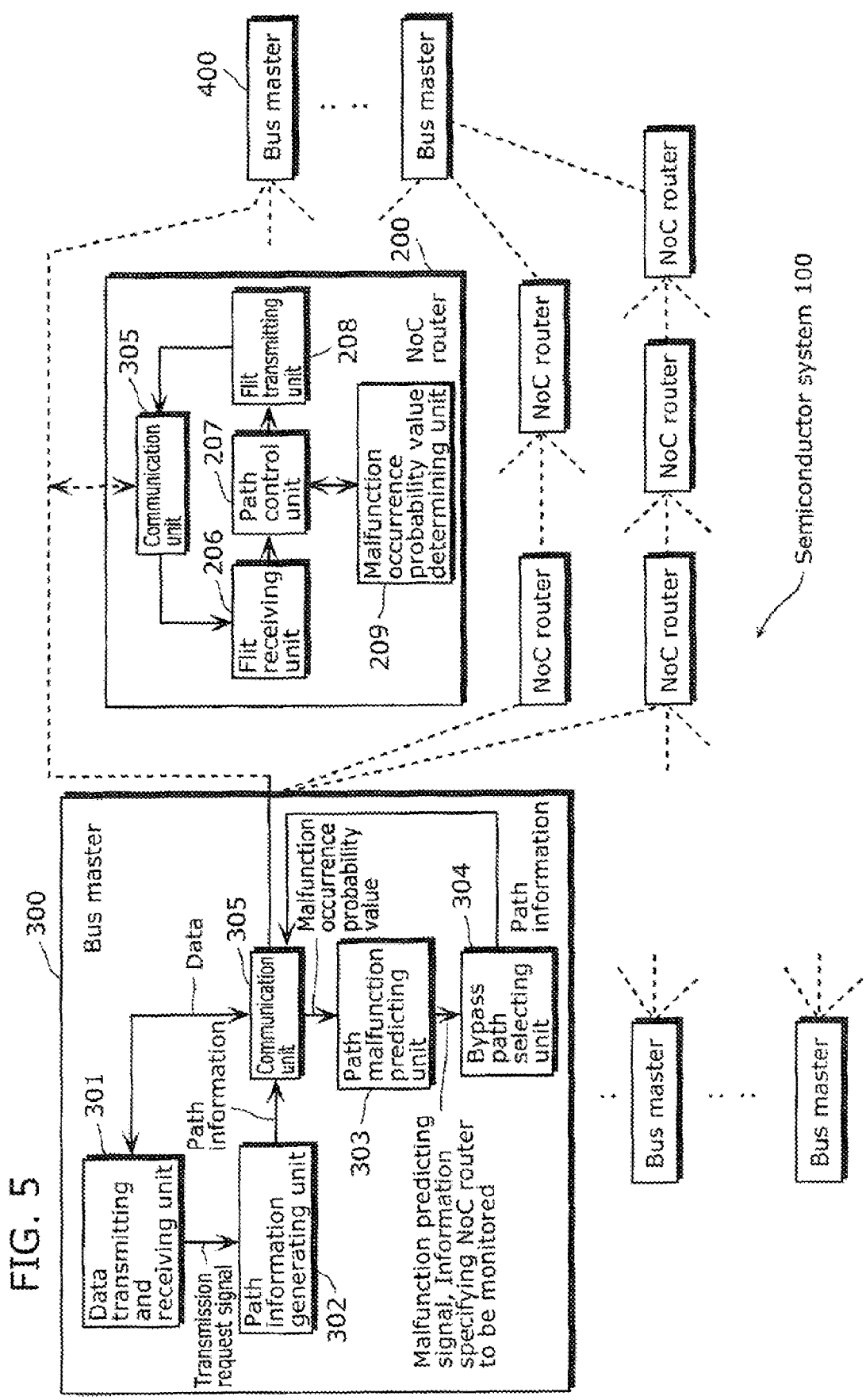
FIG. 5 illustrates an exemplary configuration of the semiconductor system according to the embodiment of the present invention.

FIG. 5 illustrates an exemplary configuration of a semiconductor system 100 including a bus master 300 as a best path selecting device according to the embodiment. FIG. 5 illustrates a method in which the bus master 300 inquires the NoC router 200.

As illustrated in FIG. 5, the semiconductor system 100 according to the embodiment is an NoC made of bus masters including bus masters 300, bus masters 400, and NoC routers 200, which are connected by network each other.

The bus master 300 and the bus master 400 correspond to the transmission bus master and the reception bus master, respectively. In addition, part of or all of the bus master may function as NoC router.

When the semiconductor system 100 is considered as a general semiconductor system, the bus master 300 corresponds to a processor or a computing unit, for example, and the NoC router 200 corresponds to a router, or an arbiter, for example.

In addition, the semiconductor system 100 may be considered as a data transmission system in a system LSI. In this case, specifically, the bus master 300 corresponds to a functional block such as a CPU, a DSP, memory, and others, and the NoC router 200 corresponds to a functional block such as a router, and an arbiter.

In FIG. 5, the NoC router 200 includes a flit receiving unit 206, a path control unit 207, a flit transmitting unit 208, and a malfunction occurrence probability value determining unit 209.

The flit receiving unit 206 receives flits, and the path control unit 207 determines a transfer destination of the received flits, and the flit transmitting unit 208 transmits the flit to the determined transfer destination. In addition, the malfunction occurrence probability value determining unit 209 determines one of, or both of the intersecting flow count and the transmission bandgap count as the malfunction occurrence probability value.

The bus master 300 includes a data transmitting and receiving unit 301, a path information generating unit 302, a path malfunction predicting unit 303, a bypass path selecting unit 304, and a communication unit 305. The data transmitting and receiving unit 301 transmits and receives data. The path information generating unit 302 generates path information indicating paths for transmitting data from the transmission bus master to the reception bus master. More specifically, the path information generating unit 302 generates path information indicating a main path and a bypass path. The path malfunction predicting unit 303 predicts a malfunction on each of the NoC routers, using the number of flows as a scale for occurrence of a malfunction on the NoC router, each of the flows being a sequence of one or more flits to be transmitted from a same transmission source to a same destination by the NoC router which is a candidate for monitoring, at least one of which is determined for each path indicated by the path information. In other words, the path malfunction predicting unit 303 predicts the malfunction on the NoC router using the malfunction occurrence probability value (at least one of or both of the intersecting flow count and the transmission bandgap count) collected from the NoC router 200. The bypass path selecting unit 304 selects one bypass path as a new main path when a malfunction of the NoC router on the main path is predicted. The communication unit 305 controls communication.

(Configuration of Semiconductor System Including Best Path Selecting Device—2)

Figure 6:
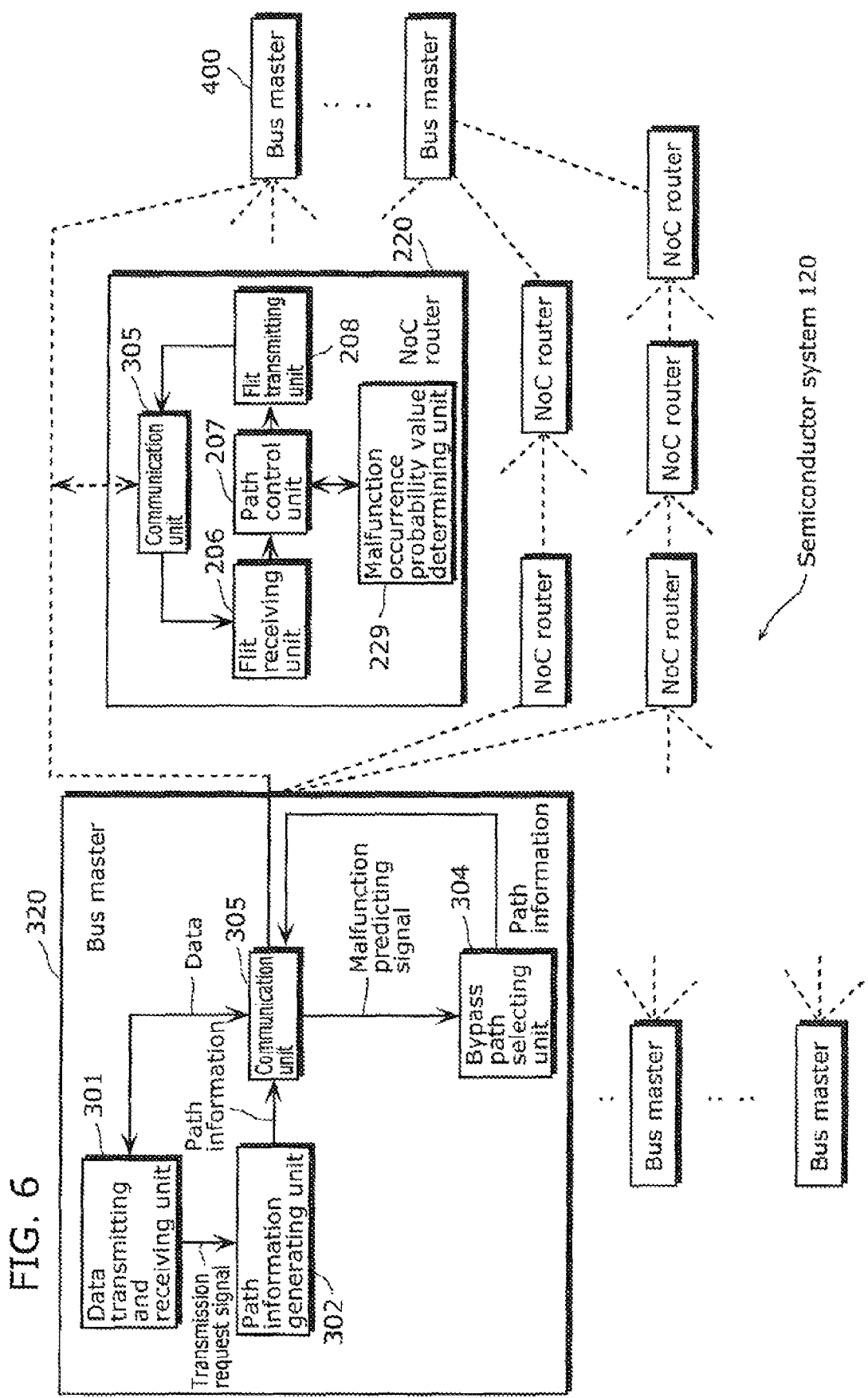
FIG. 6 illustrates another exemplary configuration of the semiconductor system according to the embodiment of the present invention.

FIG. 6 illustrates an exemplary configuration of a semiconductor system 120 including a bus master 320 as a best path selecting device according to the embodiment.

FIG. 6 illustrates a method for automatically notifying the bus master of the malfunction occurrence probability value, by the NoC router.

As illustrated in FIG. 6, the semiconductor system 120 according to the embodiment is an NoC made of bus masters including bus master 320, bus master 400, and NoC routers 220, which are connected by communication line each other.

The bus master 320 and the bus master 400 correspond to the transmission bus master and the reception bus master, respectively. In addition, part of or all of the bus master may function as NoC router.

When the semiconductor system 120 is considered as a general semiconductor system, the bus master 320 corresponds to a processor or a computing unit, for example, and the NoC router 220 corresponds to a router, or an arbiter, for example.

In addition, the semiconductor system 120 may be considered as a data transmission system in a system LSI. In this case, specifically, the bus master 320 corresponds to a functional block such as a CPU, a DSP, a memory, and others, and the NoC router 220 corresponds to a functional block such as a router, and an arbiter.

In FIG. 6, the NoC router 220 includes a flit receiving unit 206, a path control unit 207, a flit transmitting unit 208, and a malfunction occurrence probability value determining unit 229.

The flit receiving unit 206 receives flits, and the path control unit 207 determines a transfer destination of the received flits, and a flit transmitting unit 208 transmits the flit to the determined transfer destination. In addition, the malfunction occurrence probability value determining unit 229 determines one of, or both of the intersecting flow count and the transmission bandgap count as the malfunction occurrence probability value. The malfunction occurrence probability value determining unit 229 is different from the malfunction occurrence probability value determining unit 209 in that the malfunction occurrence probability value is notified of the bus master 320 when the malfunction occurrence probability value exceeds the predetermined threshold.

The bus master 320 includes a data transmitting and receiving unit 301, a path information generating unit 302, a bypass path selecting unit 304, and a communication unit 305. The data transmitting and receiving unit 301 transmits and receives data. The path information generating unit 302 generates path information indicating a main path and a bypass path. The bypass path selecting unit 304 selects one bypass path as a new main path when an malfunction of the NoC router on the main path is predicted using the malfunction occurrence probability value (at least one of or both of the intersecting flow count and the transmission bandgap count) collected from the NoC router 220. The communication unit 305 controls communication.

The following briefly describes the overview of the operations by the NoC router 200 (220) and the bus master 300 (320) including details regarding conventional technology, and describes the characteristic operation of the NoC router 200 (220) and the characteristic configuration and the operation of the bus master 300 (320) in detail.

Figure 7:
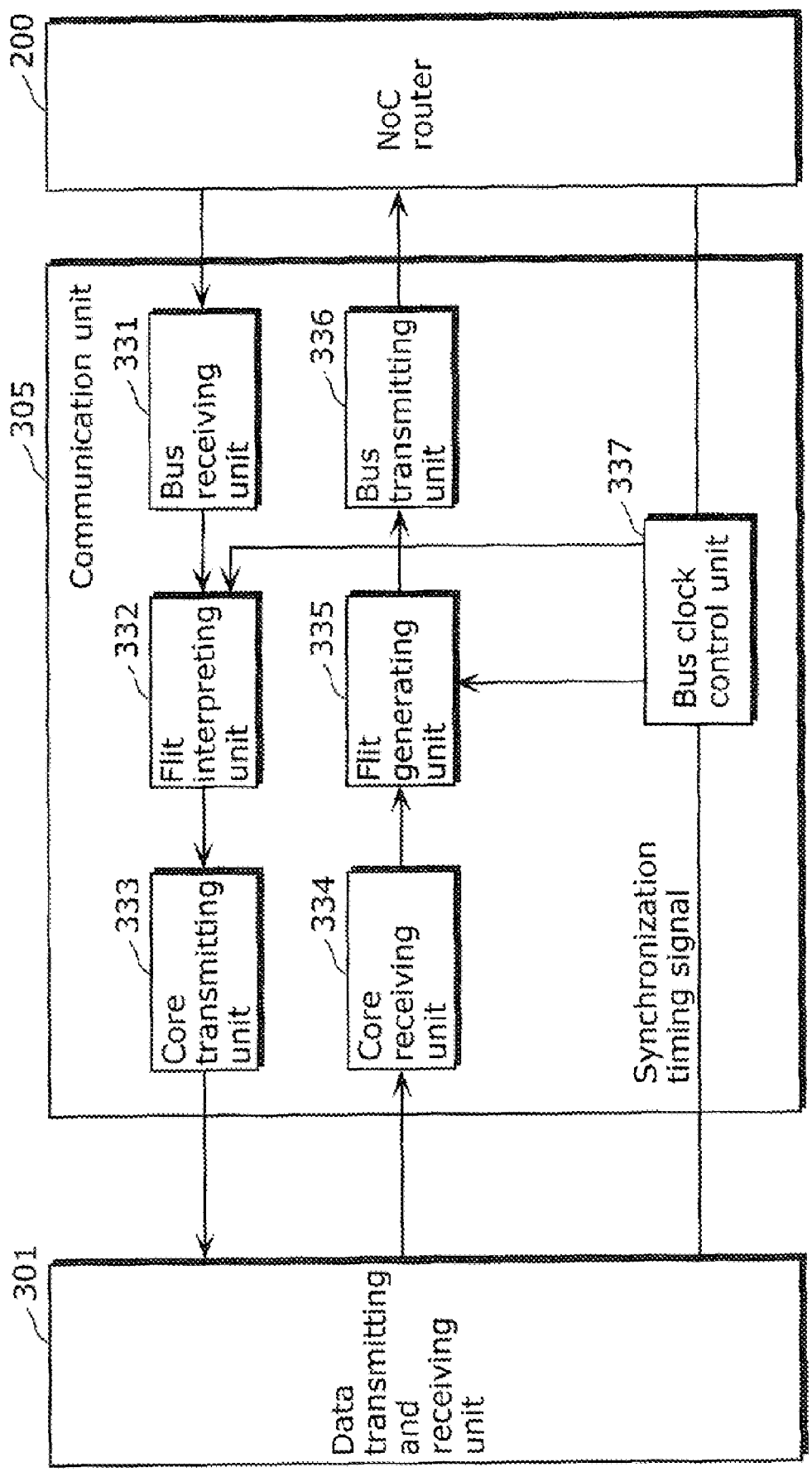
FIG. 7 illustrates an exemplary configuration of communication unit.

FIG. 7 illustrates the configuration of the communication unit 305.

The communication unit 305 includes a bus receiving unit 331, a flit interpreting unit 332, a core transmitting unit 333, a core receiving unit 334, a flit generating unit 335, a bus transmitting unit 336, and a bus clock control unit 337. The bus receiving unit 331 receives the data from the bus. The flit interpreting unit 332 interprets the content of the received flit, and reconstructs a series of data. The core transmitting unit 333 passes the data to the processing unit in the bus master at the time when the data is reconstructed to a data sequence. The core receiving unit 334 receives the data from the processing units of the bus master. The flit generating unit 335 divides the received data sequence into flits, thereby generating flits. The bus transmitting unit 336 transmits the generated flits to the bus. The bus clock control unit 337 determines the length of flits and the timing for transmitting the flits. The bus clock control unit 337 may reduce the consumption power of the semiconductor system by automatically controlling the operation clock of bus according to the traffic.

(Overview of Operations of NoC Router)

The following describes the overview of the operations by the NoC router 200 (220).

Figure 8:
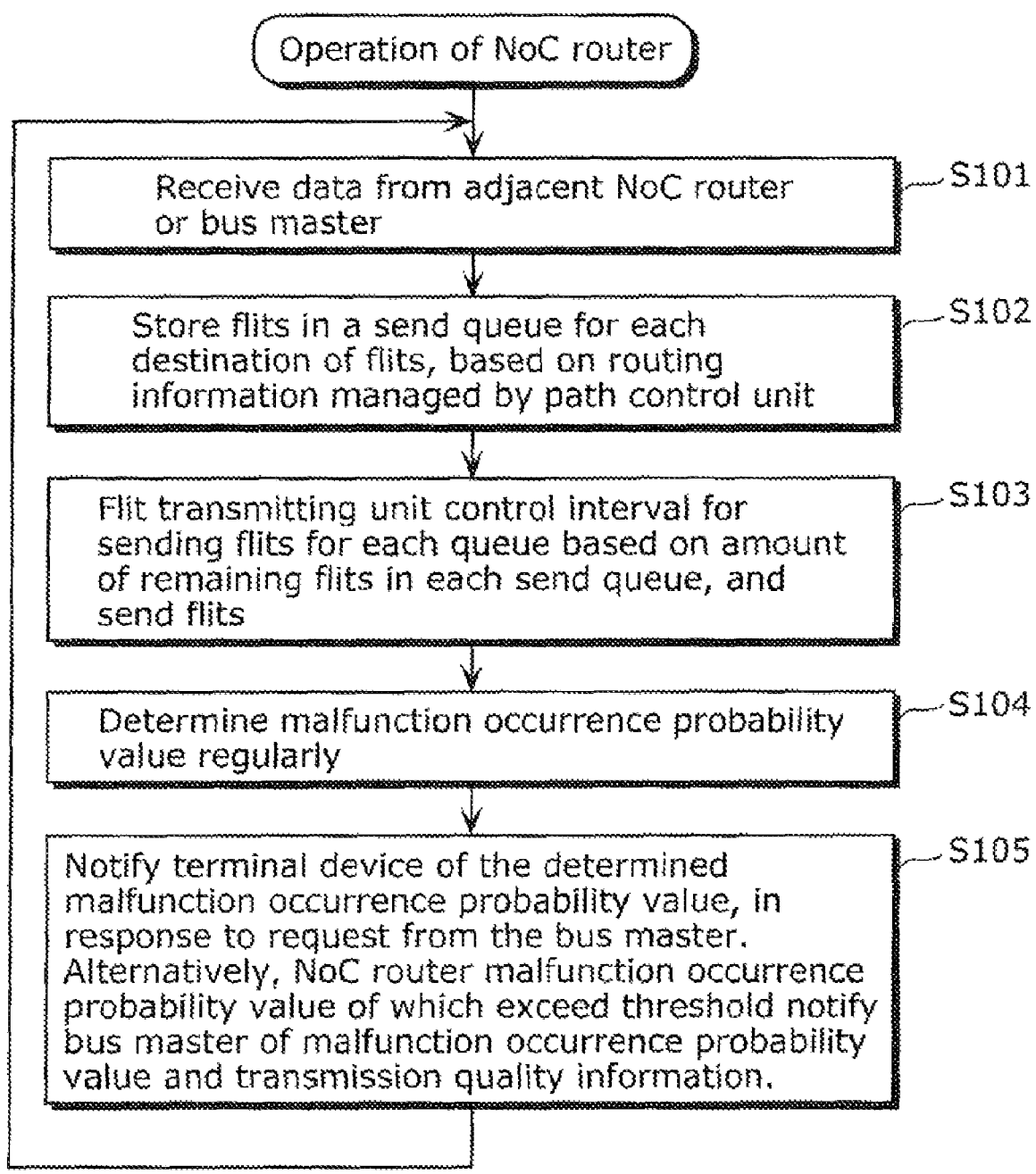
FIG. 8 is a flowchart illustrating an exemplary operation of NoC router.

FIG. 8 is a flowchart illustrating an exemplary operation of the NoC router 200 (220).

The flit receiving unit 206 receives data from the NoC router or the bus master connected by the network (S101).

The path control unit 207 stores flits in a send queue for each destination of the flits, based on the path information managed by the path control unit 207 (S102).

The flit transmitting unit 208 controls the interval for each send queue based on the amount of remaining flits in each send queue, and sends flits (S103).

The malfunction occurrence probability value determining unit 209 (229) determines a newest value of one of or both of the intersecting flow count and the transmission bandgap count as the malfunction occurrence probability value, based on a process which is to be described later (S104).

When the device is configured such that the bus master 300 inquires the NoC router 200 of the malfunction occurrence probability value (in the case of NoC router 200 shown in FIG. 5), the malfunction occurrence probability value determining unit 209 notifies the bus master 300 of the determined malfunction occurrence probability value, in response to the request from the bus master 300.

In the case where the malfunction occurrence probability value is automatically notified of the bus master 300 from the NoC router 200 (in the case of the NoC router 220 in FIG. 6), the NoC router 220 the malfunction occurrence probability value of which exceeds the threshold notifies the bus master 300 of the malfunction occurrence probability value and transmission quality information such as the delay time and jitter (S105).

(Overview of Operations of Bus Master)

The following describes the overview of the operations by the bus master 300.

Figure 9:
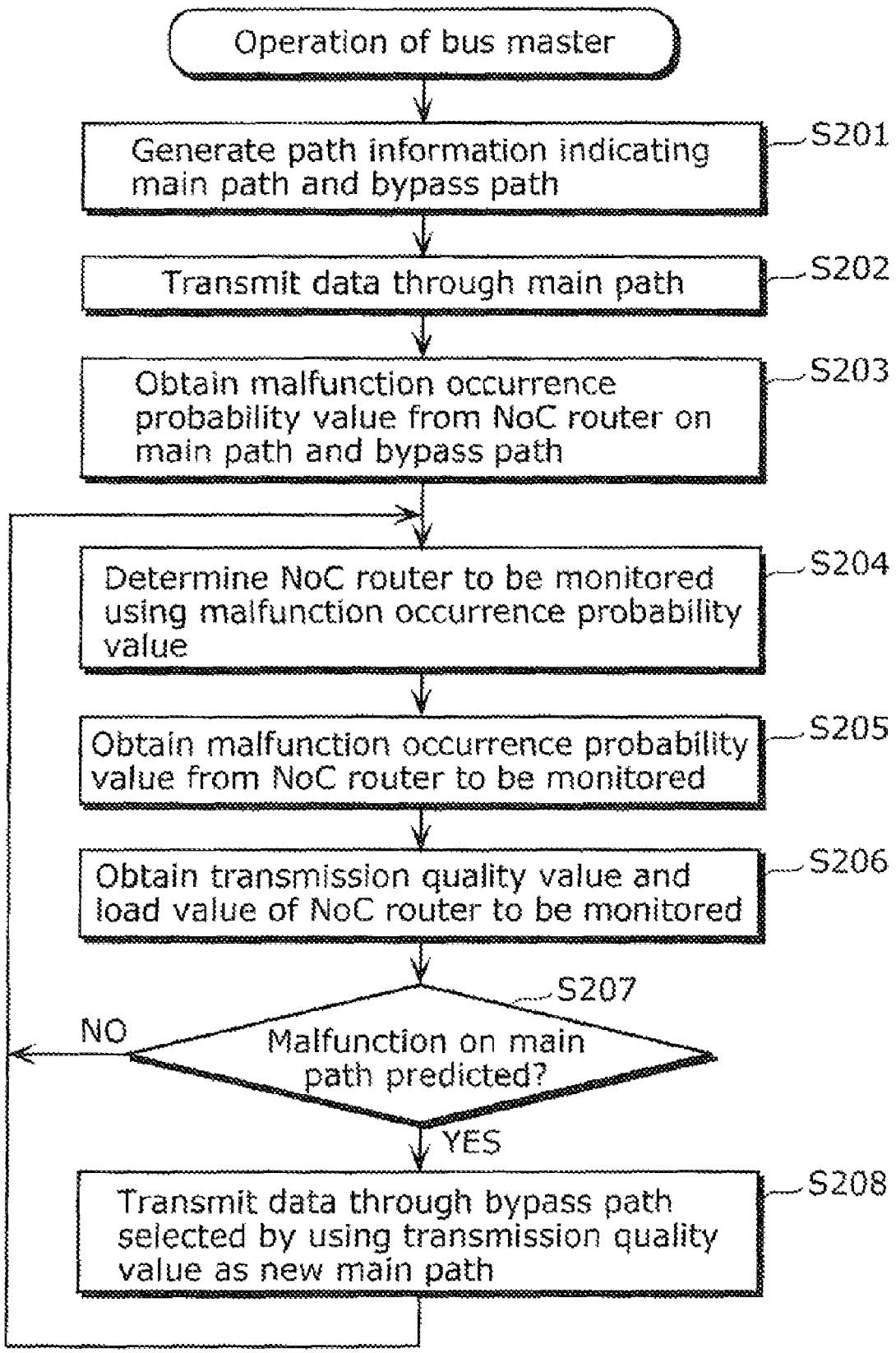
FIG. 9 is a flowchart illustrating an exemplary operation of bus master.

FIG. 9 is a flowchart illustrating an exemplary operation of the bus master 300.

FIG. 9 illustrates operations by the bus master 300 in a semiconductor system 100 in which the bus master 300 inquires the NoC router 200 of the malfunction occurrence probability value.

The path information generating unit 302 generates path information indicating the main path and the bypass path, and notifies the NoC router 200 on the main path of the path information indicating the main path (S201).

The data transmitting and receiving unit 301 transmits data including various types of information such as text, video, and audio, through the main path (S202).

The communication unit 305 collects the malfunction occurrence probability value, which is determined by the malfunction occurrence probability value determining unit 209 on each NoC router 200, from each NoC router 200 on the main path and the bypass path (S203).

The path malfunction predicting unit 303 determines a monitoring frequency value for more frequently selecting, as the NoC router to be monitored, the NoC router in which malfunction is more likely to occur, according to the malfunction occurrence probability value collected from each NoC router 200, and selects the NoC router to be monitored using the determined monitoring frequency value (S204).

The path malfunction predicting unit 303 collects, through the communication unit 305, the newest malfunction occurrence probability value from the NoC router selected as the NoC router to be monitored (S205).

The configuration and process for selecting and monitoring the NoC router by the path malfunction predicting unit 303 shall be described later in detail.

For the NoC router 200 selected as the NoC router to be monitored, the bypass path selecting unit 304 obtains a transmission quality value which indicates the transmission quality and the load value which indicates the amount of load (S206).

The path malfunction predicting unit 303 predicts the malfunction of the NoC router using the collected malfunction occurrence probability value (S207). For example, when a malfunction occurrence probability value exceeding a predetermined upper limit for good evaluation is obtained from the NoC router 200 on the main path, the path malfunction predicting unit 303 notifies the bypass path selecting unit 304 of the prediction of malfunction of the NoC router on the main path (YES in S207)

When the notification is received (YES in S207), the bypass path selecting unit 304 selects a bypass path which does not include an NoC router with the transmission quality represented by the determined transmission quality value less than the predetermined standard as a new main path. Typically, the bypass path is with the best transmission quality indicated by the determined transmission quality value.

Subsequently, the bypass path selecting unit 304 transmits data through the new main path by notifying the NoC router 200 on the new main path of the path information indicating the new main path (S208).

The bypass path selection by the bypass path selecting unit 304 shall be described later in detail.

(Overview of Operations of Bus Master 2)

The following describes the overview of the operations by the bus master 320 as the best path selecting device.

FIG. 10 is a flowchart illustrating an exemplary operation of the bus master 320. FIG. 10 illustrates the operations by the bus master 320 in the semiconductor system 120 in which the NoC router automatically notifies the bus master 320 of the malfunction occurrence probability value.

The path information generating unit 302 generates path information indicating the main path and the bypass path, and notifies the NoC router 200 on the main of the path information indicating the main path (S2011).

The data transmitting and receiving unit 301 transmits data including various types of information such as text, video, and audio, through the main path (S2021).

The malfunction occurrence probability value determining unit 229 transmits the newest malfunction occurrence probability value, from the NoC router 200 to the bus master 320 through the communication unit 305 (S2031).

When the received malfunction occurrence probability value exceeds the predetermined threshold (Yes in S2041), the bus master 320 selects a path including an NoC router 200 the malfunction occurrence probability value of which does not exceed the threshold, and determines the path as the new main path (S2051). When there is no path including the NoC router 200 the malfunction occurrence probability value of which does not exceed the threshold (No in S2041), the current path is maintained.

(Details of Determining Intersecting Flow Count and Transmission Bandgap Count)

The following specifically describes the determining of the intersecting flow count and the transmission bandgap count by the malfunction occurrence probability value determining unit 209 (S104 in FIG. 8).

The malfunction occurrence probability value determining unit 229 performs the process similar to the malfunction occurrence probability value determining unit 209.

First, a case where the malfunction occurrence probability value determining unit 209 determines the intersecting flow count and the malfunction occurrence probability value determining unit 209 notifies the bus master 300 of the determined intersecting flow count as the malfunction occurrence probability value shall be described.

Figures 11A, 11B:
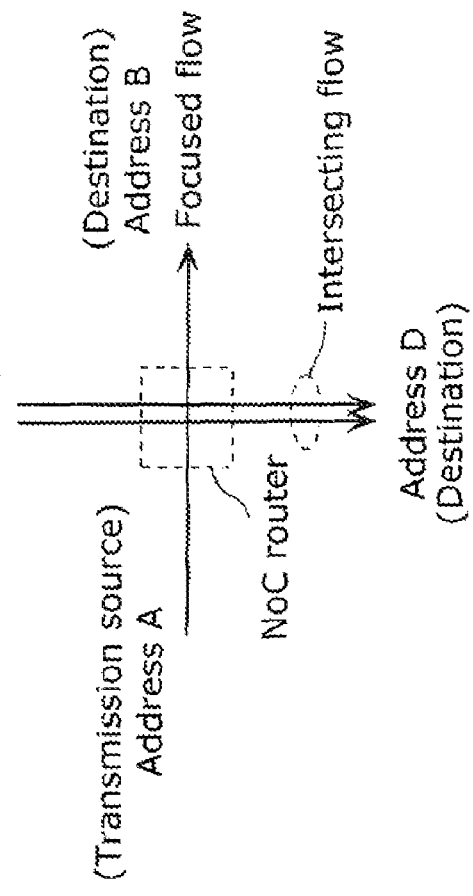
FIG. 11A illustrates an exemplary flow relayed by the NoC router.
FIG. 11B illustrates an example of the flow information table.

FIG. 11A illustrates an example of the flow relayed by the NoC router 200.

The example in FIG. 11A illustrates a flow 1 which is a focused flow transmitted on the main path (a sequence of flits from an address A to an address B) and two flows intersecting the flow 1, that is, a flow 2 and a flow 3 (sequences of flits from the address C to the address D).

FIG. 11B illustrates an example of the flow information table set on the malfunction occurrence probability value determining unit 209. The flow information table records the flow information for each flow relayed by the NoC router 200.

The flow information includes an identification number for identifying the flow, an address of the transmission source, the port number of the transmission source, the address of the destination, the port number of the destination of the packets constituting the flow, and the update time which is a last time when the flow is checked.

The contents of the flow information table illustrated in FIG. 11B corresponds to FIG. 11A. For example, for the flow 1, the flow information indicating that the identification number is 1, the address of the transmission source is A, the port number of the transmission source is 1000, the address of the destination is B, the port number of destination is 2000, and the updating time is T1.

Figure 12:
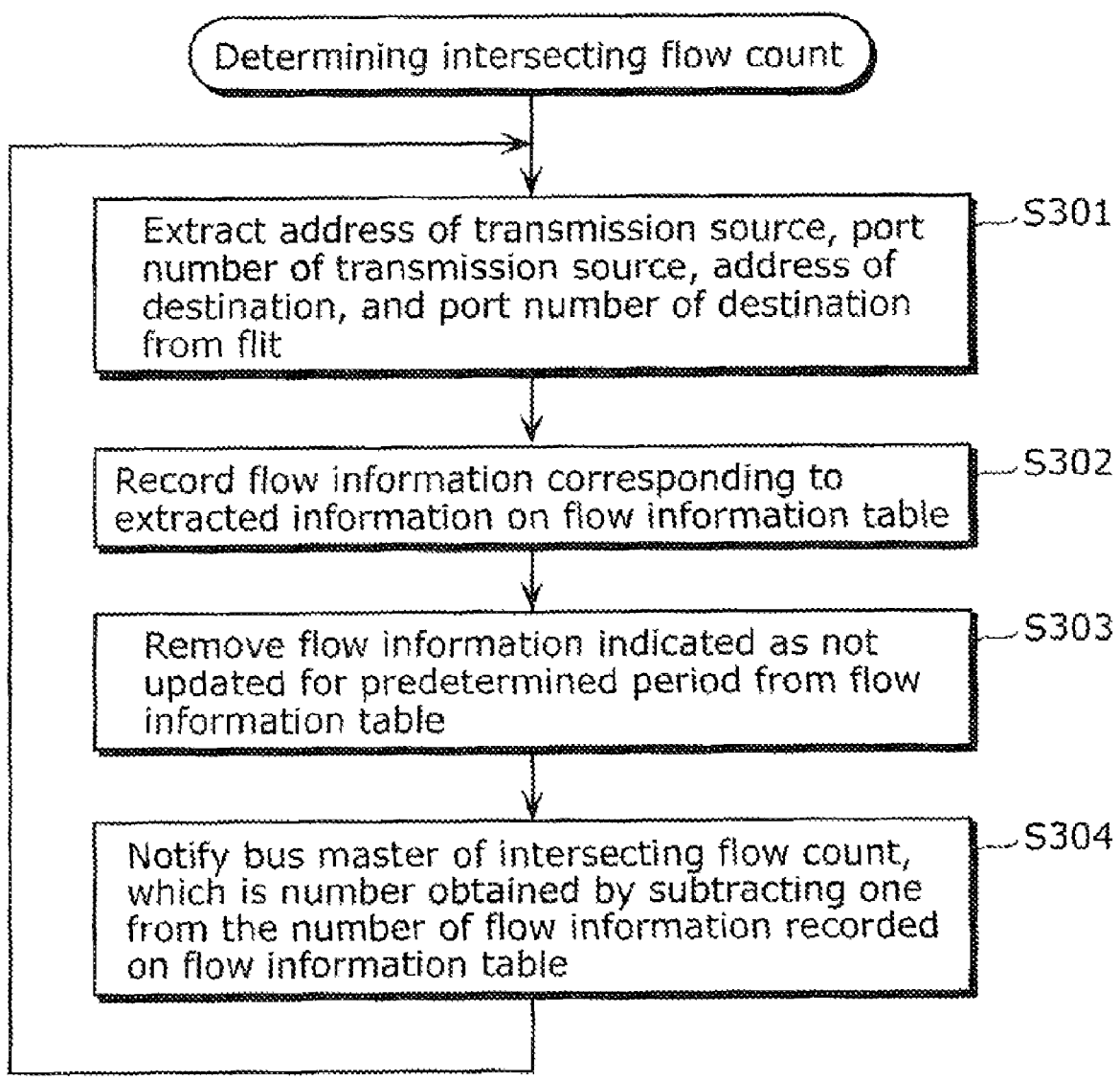
FIG. 12 is a flowchart illustrating an example of determining intersecting flow count.

FIG. 12 is a flowchart illustrating an example of determining intersecting flow count performed by the malfunction occurrence probability value determining unit 209.

The intersecting flow count is determined each time the NoC router 200 relays one flit, for example.

The path control unit 207 extracts the address of the transmission source and the address of the destination from the header of the flit, and extracts the port number of the transmission source and the port number of the destination from the header of the flit by analyzing the flit to be relayed (S301).

Note that, as a method for routing the flit transfer, a dimensional routing for calculating the shortest path for flit transfer by calculating the shortest path of the flit between the NoC router 200 (220) in the order of the X axis and Y axis in the semiconductor system 100.

The malfunction occurrence probability value determining unit 209 searches for the flow information which has values matching the extracted values of the address of the transmission source, the address of the destination, the port number of the transmission source, and the port number of the destination, from the flow information table.

If the flow information is present on the flow information table, the update time of the flow information on the flow information table is changed to the current time.

If the flow information is not present on the flow information table, the update time is generated as the current time, and the flow information is added to the flow information table (S302).

The flow information that is indicated as not updated for a predetermined period by the comparison between the update time and the current time is removed from the flow information table (S303).

The malfunction occurrence probability value determining unit 209 notifies the bus master 300 of the intersecting flow count as a malfunction occurrence probability value, which is a number obtained by subtracting one from the number of flow information recorded on the flow information table, when the bus master 300 inquires the malfunction occurrence probability value (S304).

Note that, in the case of the malfunction occurrence probability value determining unit 229, when the intersecting flow count exceeds the predetermined threshold, the intersecting flow count is notified of the bus master 320 as the malfunction occurrence probability value.

Next, a case where the malfunction occurrence probability value determining unit 209 determines the transmission bandgap count, and notifies the bus master 300 of the determined transmission bandgap count as the malfunction occurrence probability value shall be described.

Figures 13A, 13B:
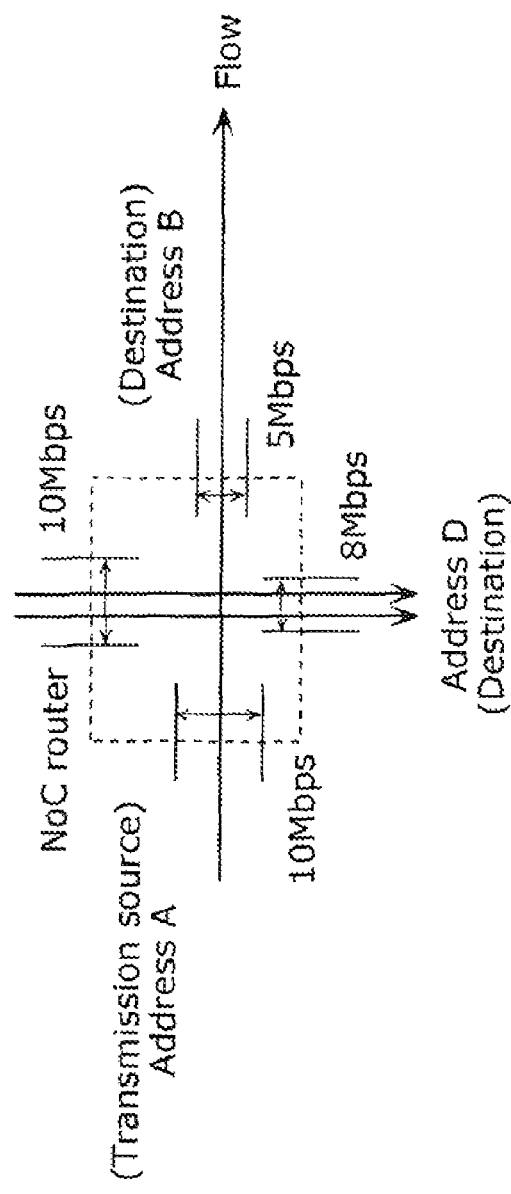
FIG. 13A illustrates an example of transmission bandgap in the NoC router.
FIG. 13B illustrates an example of the flow information table.

FIG. 13A illustrates an example of transmission bandgap in the NoC router 200.

FIG. 13A illustrates an example including a flow 1 which is a focused flow transmitted on the main path (a sequence of flits from an address A to an address B) and two flows intersecting the flow 1, that is, a flow 2 and a flow 3 (sequences of flits from the address C to the address D).

On the flow 1, the transmission band 5 Mbps on the transmission side is narrower than the transmission band 10 Mbps on the reception side. On the flows 2 and 3, the transmission band 8 Mbps on the transmission side is narrower than the transmission band 10 Mbps on the reception side.

In other words, all of the flow 1, flow 2, flow 3 have the transmission bandgap in the example in FIG. 13A.

Here, it is assumed that the information indicating the transmission band on the reception side and the information Indicating the transmission band on the transmission side for each flow are recorded on the flit receiving unit 206 and the flit transmitting unit 208, respectively.

FIG. 13B illustrates an example of the flow information table managed by the malfunction occurrence probability value determining unit 209.

The flow information table records the flow information for each flow with the transmission bandgap in the NoC router 200. The flow information includes an identification number for identifying the flow, an address of the transmission source, the port number of the transmission source, the address of the destination, the port number of the destination and the update time of the flits constituting the flow.

The contents of the flow information table illustrated in FIG. 13B corresponds to FIG. 13A.

For example, for the flow with the identification number 1 and with the transmission bandgap, the flow information indicating that the address of the transmission source is A, the port number of the transmission source is 1000, the address of the destination is B, the port number of destination is 2000, and the update time (last time when the flow information is checked) is T1 is recorded.

Figure 14:
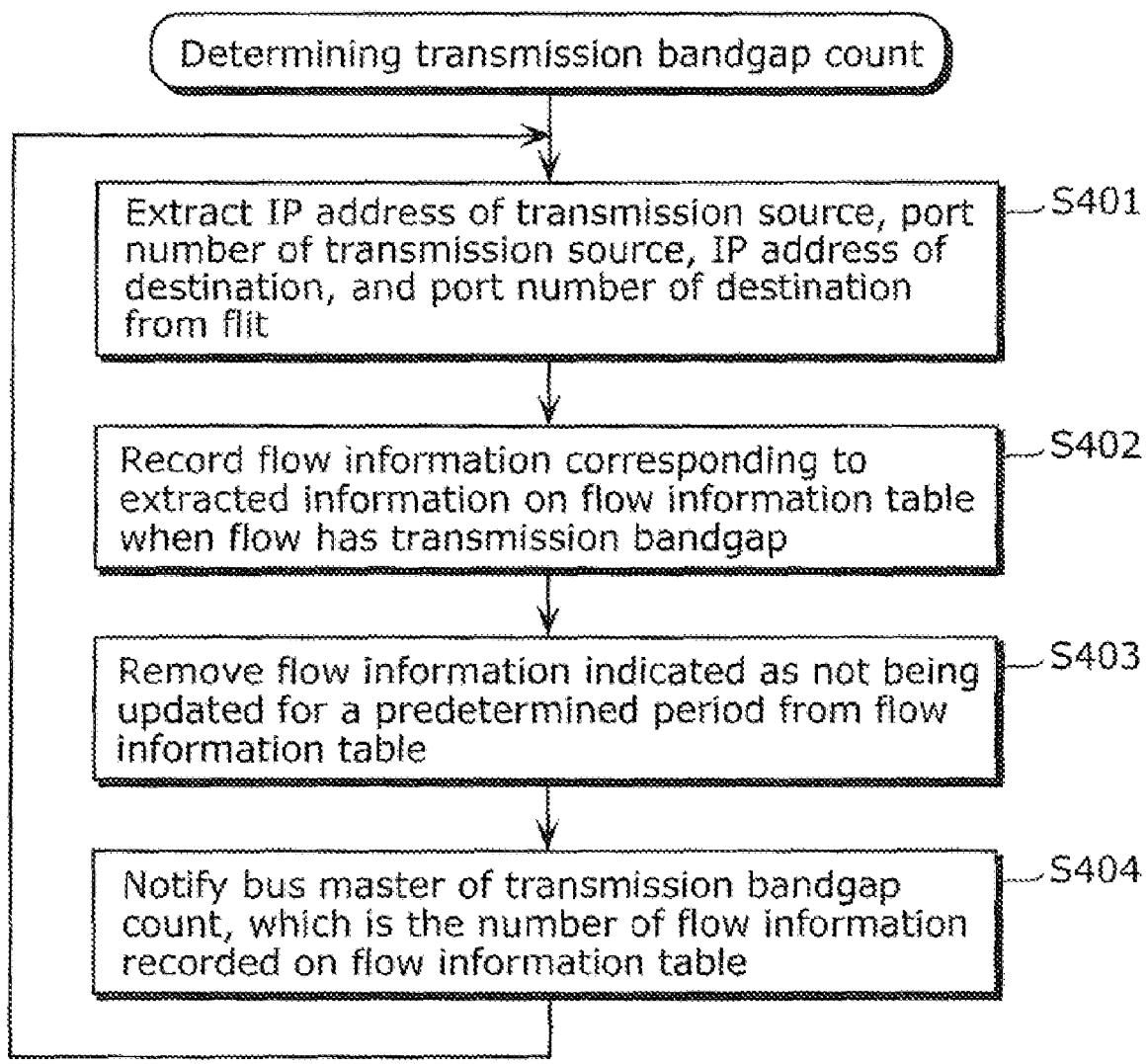
FIG. 14 is a flowchart illustrating an example of determining transmission bandgap count.

FIG. 14 is a flowchart illustrating an example of transmission bandgap count determining performed by the malfunction occurrence probability value determining unit 209.

The transmission bandgap count is determined each time the NoC router 200 relays one flit, for example.

In the same manner as the above-described step S301, the path control unit 207 extracts the address of the transmission source, the address of the destination, the port number of the transmission source, and the port number of the destination (S401).

The malfunction occurrence probability value determining unit 209 obtains the information indicating the transmission band on the reception side of the flow to be relayed and the information indicating the transmission band on the transmission side of the flow to be relayed from the flit receiving unit 206 and the flit transmitting unit 208, respectively.

When the obtained information indicates that the flow to be relayed has the transmission bandgap, the flow information regarding the flow to be relayed is added to the flow information table, or the update time of the flow information is changed in the same manner as the step S302 (S402).

The malfunction occurrence probability value determining unit 209 removes the flow information that is indicated by the comparison between the update time and the current time as not updated for a predetermined period the flow information table (S403).

The malfunction occurrence probability value determining unit 209 notifies the bus master 300 of the transmission bandgap count, which is the number of flow information recorded on the flow information table as the malfunction occurrence probability value, when the bus master 300 inquires the malfunction occurrence probability value (S404).

Note that, in the case of the malfunction occurrence probability value determining unit 229, when the transmission bandgap exceeds the predetermined threshold, the transmission bandgap is notified of the bus master 320 as the malfunction occurrence probability value.

(Details of Configuration of Path Malfunction Predicting Unit)

The following describes the configuration of the path malfunction predicting unit 303 in detail.

Figure 15:
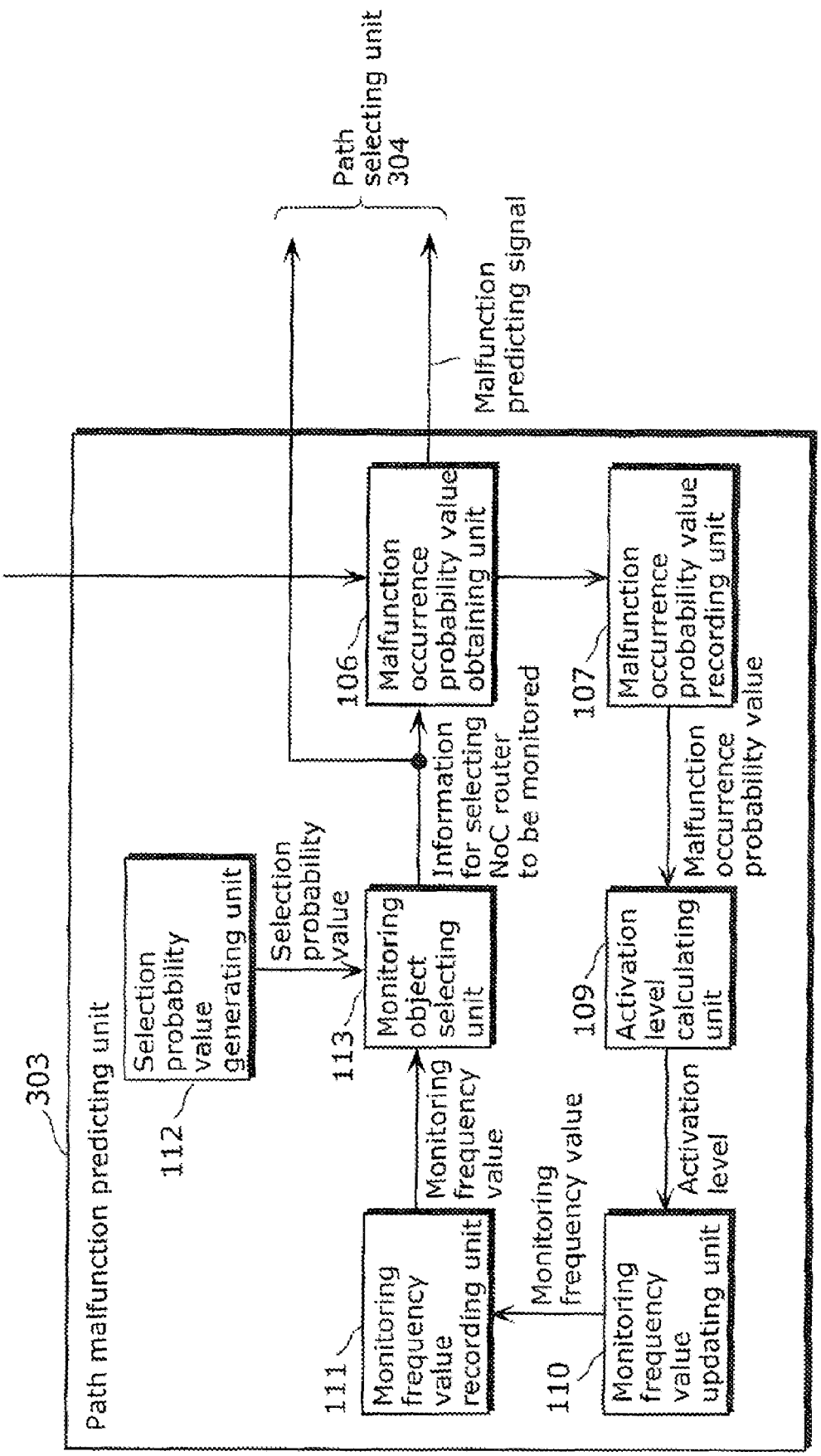
FIG. 15 is a block diagram illustrating an example of the functional configuration of the path malfunction predicting unit.

FIG. 15 is a block diagram illustrating an example of the functional configuration of the path malfunction predicting unit 303.

The path malfunction predicting unit 303 includes a malfunction occurrence probability value obtaining unit 106, a malfunction occurrence probability value storage unit 107, an activation level calculating unit 109, a monitoring frequency value updating unit 110, a monitoring frequency value storage unit 111, a selection probability value generating unit 112, and a monitoring object selecting unit 113.

The malfunction occurrence probability value obtaining unit 106 obtains the malfunction occurrence probability value (the intersecting flow count and the transmission bandgap count) from the NoC router selected by the monitoring object selecting unit 113 as the NoC router to be monitored.

The malfunction occurrence probability value is obtained by issuing inquiring flit to the NoC router to be monitored.

The malfunction occurrence probability value may be collected periodically (for example, at a time when the current time matches or passes the estimated measurement time), or may be performed according to another time schedule.

When the malfunction occurrence probability value obtaining unit 106 obtains the malfunction occurrence probability value from the NoC router on the main path, the malfunction occurrence probability value obtaining unit 106 determines that the malfunction is likely to occur on the main path if the malfunction occurrence probability value exceeds a predetermined upper limit for good evaluation, and notifies the bypass path selecting unit 304 that the malfunction on the main path is predicted.

The malfunction occurrence probability value storage unit 107 stores, for each NoC router, the malfunction occurrence probability value obtained by the malfunction occurrence probability value obtaining unit 106.

The activation level calculating unit 109 calculates an activation level that indicates a tendency where the larger the malfunction occurrence probability value of the NoC router, the higher the monitoring frequency value, from the malfunction occurrence probability value of each NoC router stored in the malfunction occurrence probability value storage unit 107 and the monitoring frequency of each NoC router stored in the monitoring frequency value storage unit 111.

The monitoring frequency value updating unit 110 calculates a new monitoring frequency value for each NoC router based on the calculated activation level, and updates the monitoring frequency value stored by the monitoring frequency value storage unit 111 into a new monitoring frequency.

The monitoring object selecting unit 113 stochastically selects the NoC router to be monitored by adding the selection probability value generated by the selection probability value generating unit 112 to the monitoring frequency of each NoC router stored in the monitoring frequency value storage unit 111.

The NoC router selected to be monitored is a NoC router for obtaining the malfunction occurrence probability value by the malfunction occurrence probability value obtaining unit 106 next time, and to be notified of the bypass path selecting unit 304, and is an object for determining the transmission quality value and the load value by the bypass path selecting unit 304.

Repeatedly performing the series of process allows weighting the frequency of monitoring the NoC router according to the probability of the malfunction and thoroughly monitoring all of NoC routers at the same time.

(Detail of NoC Router Selection and Monitoring by Path Malfunction Predicting Unit)

The following further describes selection and monitoring of the NoC router by the path malfunction predicting unit 303 configured as described above in detail.

First, the concept of monitoring accuracy of each NoC router shall be described.

Note that, the monitoring accuracy here refers to the validity of the monitoring frequency.

Figure 16:
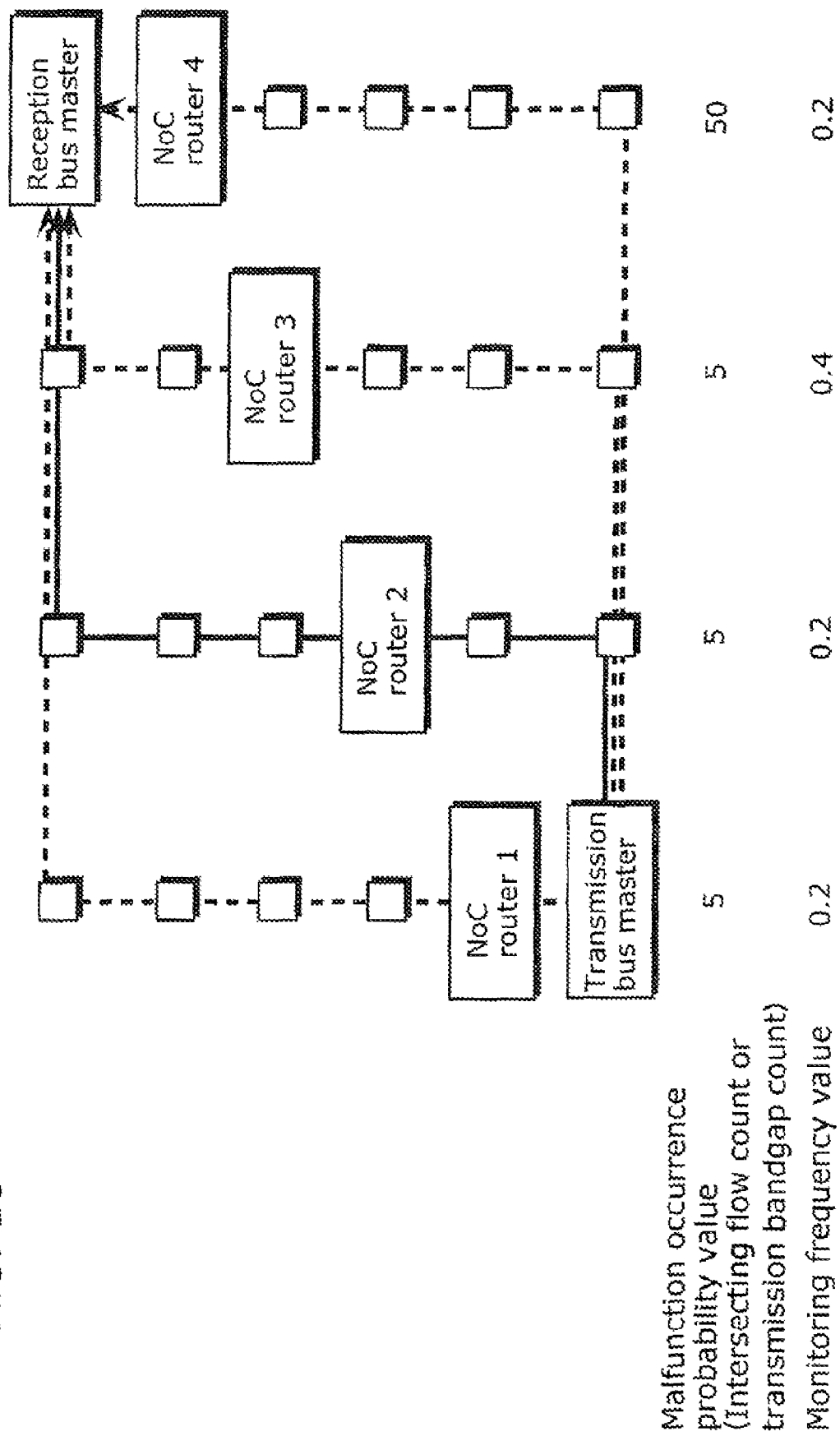
FIG. 16 illustrates examples of the monitoring frequency value and the malfunction occurrence probability value of each NoC router.
Figure 17:
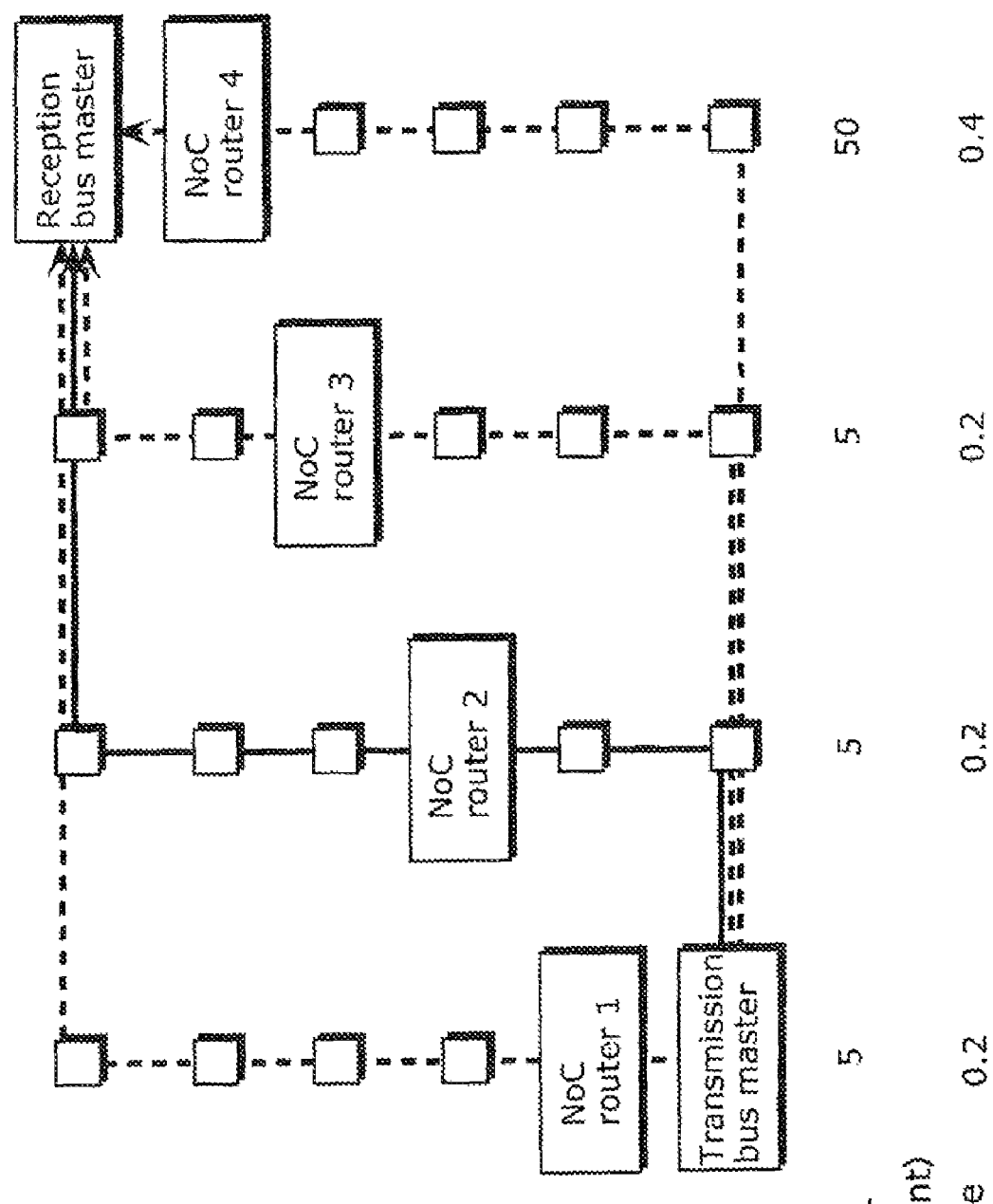
FIG. 17 illustrates examples of the monitoring frequency value and the malfunction occurrence probability value of each NoC router.

FIGS. 16 and 17 illustrate examples of the monitoring frequency value and the malfunction occurrence probability value of each NoC router.

The examples in FIGS. 16 and 17 illustrate a main path indicated in solid line and three bypass paths indicated in dashed lines as transmission paths from the transmission bus master to the reception bus master.

Furthermore, one NoC router in each of the main path and the bypass paths is determined as a candidate for monitoring.

A NoC router to be monitored is stochastically selected from the four NoC routers that are candidates for monitoring. The malfunction occurrence probability value and the transmission quality value are obtained from the selected NoC router.

Note that, in FIGS. 16 and 17, the transmission bus master, the NoC router, and the reception bus master are schematically illustrated, and they look different from the actual appearance.

The malfunction occurrence probability value here refers to the intersecting flow count and the transmission bandgap count.

The malfunction occurrence probability value 50 of the NoC router 4 is 10 times higher than the malfunction occurrence probability value 5 of the NoC routers 1 to 3. This indicates that the malfunction is more likely to occur in the NoC router 4 than on the NoC routers 1 to 3.

Furthermore, the monitoring frequency value indicates the frequency of selecting each NoC router as the NoC router to be monitored.

For example, the monitoring frequency value 0.2 of the NoC router 1 indicates that the NoC router 1 is monitored for 20% of all monitoring operations.

It is reasonable to monitor the NoC router with higher probability of malfunction at higher frequency for accurately predicting the malfunction in the limited number of monitoring operations.

However, in the example in FIG. 16, the NoC router to be highly-frequently monitored is the NoC router 3. The NoC router 4 which is considered to have high probability of malfunction is given the same monitoring frequency value as the other NoC routers 1 and 2 which are considered to have low probability of malfunction.

As described above, when the tendency that the NoC router with higher malfunction occurrence probability value has higher monitoring frequency is small, the status is defined as low monitoring accuracy.

On the other hand, in the example in FIG. 17, the highest monitoring frequency value is of the NoC router 4 with higher malfunction occurrence probability value than those of the other NoC routers, and the monitoring frequency values of the other three NoC routers are low.

As described above, when the tendency that the NoC router with higher malfunction occurrence probability value has higher monitoring frequency is large, it is defined as high monitoring accuracy.

(Malfunction Occurrence Probability Value Storage Unit 107)

The malfunction occurrence probability value storage unit 107 stores the malfunction occurrence probability value obtained by the malfunction occurrence probability value obtaining unit 106, using the malfunction occurrence probability value table.

FIG. 18 illustrates exemplary data structure of the malfunction occurrence probability value table.

The malfunction occurrence probability value table records the identification numbers of NoC routers in the first column, the addresses of the NoC routers in the second column, and the malfunction occurrence probability values (the intersecting flow count or the transmission bandgap count) obtained from the NoC routers in the third column.

(Monitoring Frequency Value Storage Unit 111)

The monitoring frequency value storage unit 111 stores the monitoring frequency values of each NoC router using the monitoring frequency value table.

FIG. 19 illustrates an example of data structure of the monitoring frequency value table.

The monitoring frequency value table records the identification numbers of NoC routers in the first column, the addresses of the NoC routers in the second column, and the monitoring frequency values of the NoC routers in the third column.

(Activation Level Calculating Unit 109)

The activation level calculating unit 109 calculates the activation level $\alpha$ which indicates the level of the monitoring accuracy.

The activation level $\alpha$ is a quantified index of the level of tendency that the NoC router with higher probability of malfunction is monitored at higher frequency. More specifically, the activation level $\alpha$ refers to the level of correlation between the malfunction occurrence probability value and the monitoring frequency value.

Figure 20:
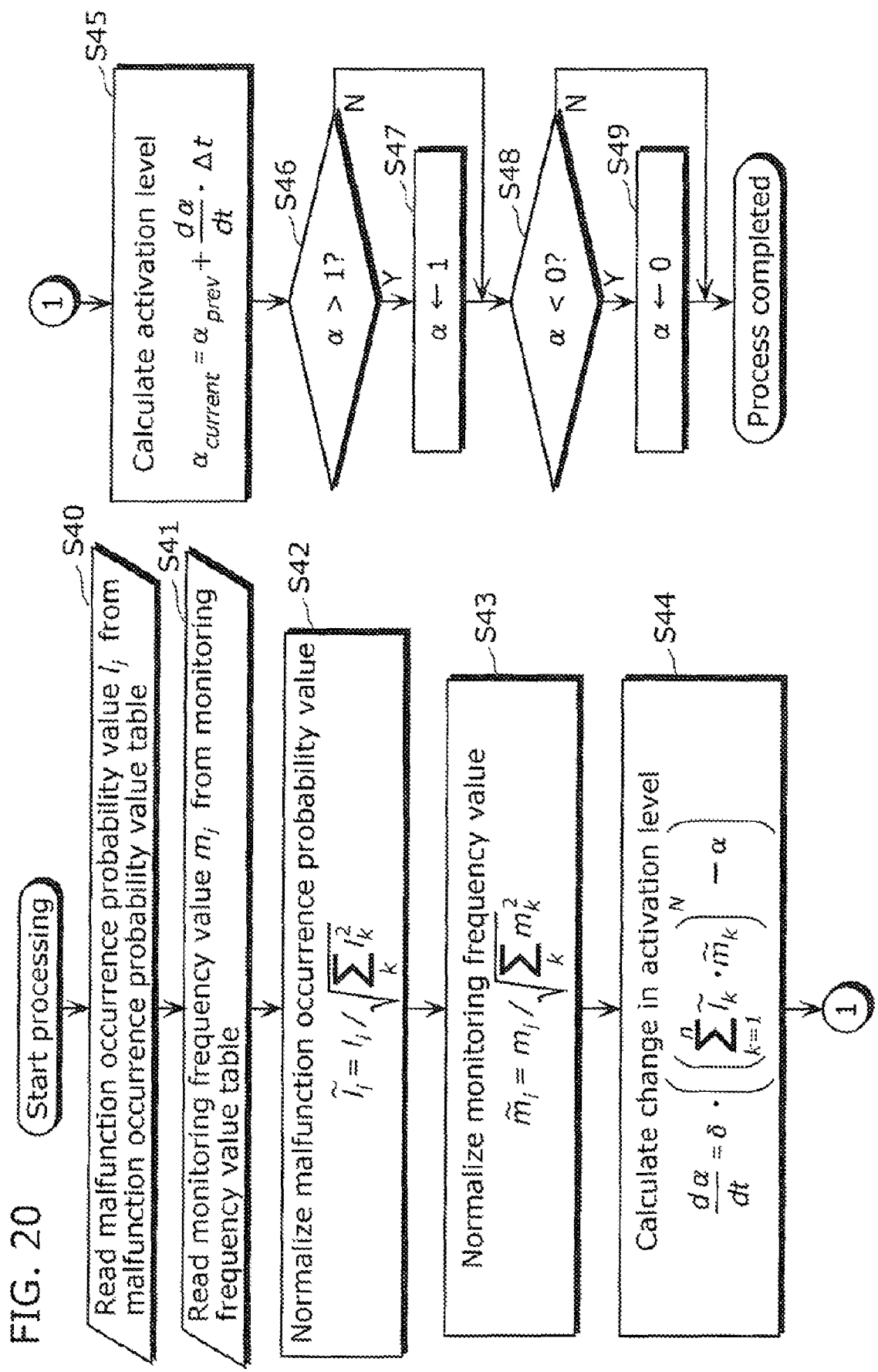
FIG. 20 is a flowchart illustrating an example of process performed by an activation level calculating unit.

FIG. 20 is a flowchart illustrating an example of process performed by an activation level calculating unit 109.

The activation level calculating unit 109 reads the malfunction occurrence probability value $l_i$ of each NoC router from the malfunction occurrence probability value table (S40), reads the monitoring frequency value $m_i$ of the NoC router from the monitoring frequency value table in the monitoring frequency value storage unit 111 (S41), and calculates the change in the activation level $\alpha$ according to Equation 1, using the read malfunction occurrence probability value and the monitoring frequency value (S42 to S44).

[Equation 1]

$$\frac{d\alpha}{dt} = \delta \cdot \left( \left( \sum_{k=1}^{n} \tilde{l}_k \cdot \tilde{m}_k \right)^N - \alpha \right) \quad \text{(Equation 1)}$$

Equation 1 is an example of the definition of the dynamics of the activation level $\alpha$, where n denotes the number of NoC routers that are candidates for monitoring, $l_i$ denotes the malfunction occurrence probability value of the NoC router i recorded on the malfunction occurrence probability value table, $m_i$ denotes the monitoring frequency value of the NoC router, and N, $\delta$ denote the constants for controlling the rates of change of the dynamics.

The term of the product-sum operation of the malfunction occurrence probability value and the monitoring frequency value indicates the level of correlation between the malfunction occurrence probability value and the monitoring frequency value.

The tildes on $l_i$ and $m_i$ indicate that the values are normalized, that is, in the relationship shown in Equations 2 and 3, respectively.

[Equation 2]

$$\tilde{l}_i = l_i \bigg/ \sqrt{\sum_k l_k^2} \quad \text{(Equation 2)}$$

[Equation 3]

$$\tilde{m}_i = m_i \bigg/ \sqrt{\sum_k m_k^2} \quad \text{(Equation 3)}$$

The activation level $\alpha$ is updated according to Equation 4, using the change in the activation level $\alpha$ calculated by Equation 1 (S45). Here, $\Delta t$ denotes a time interval determined by the updating cycle.

[Equation 4]

$$\alpha_{current} = \alpha_{prev} + \frac{d\alpha}{dt} \cdot \Delta t \quad \text{(Equation 4)}$$

The variance range of the activation level α is restricted to a closed interval between 0 and 1, for ease of handling (S46 to S49). Thus, the activation level α is restricted to a real number between 0 and 1 inclusive.

The activation level α close to 0 corresponds to low monitoring accuracy, while the activation level α close to 1 corresponds to high monitoring accuracy.

This is because, according to the dynamics of Equation 4, the activation level α becomes close to 1 as the monitoring frequency value of the NoC router comes close to the preferable status considering the malfunction occurrence probability value, and becomes close to 0 as the monitoring frequency value of the NoC router deviates from the malfunction occurrence probability value.

(Monitoring Frequency Value Updating Unit 110)

The monitoring frequency value updating unit 110 calculates a new monitoring frequency $m_i$ for the NoC routers which are candidates for monitoring, based on the value of the activation level α determined by the activation level calculating unit 109.

Figure 21:
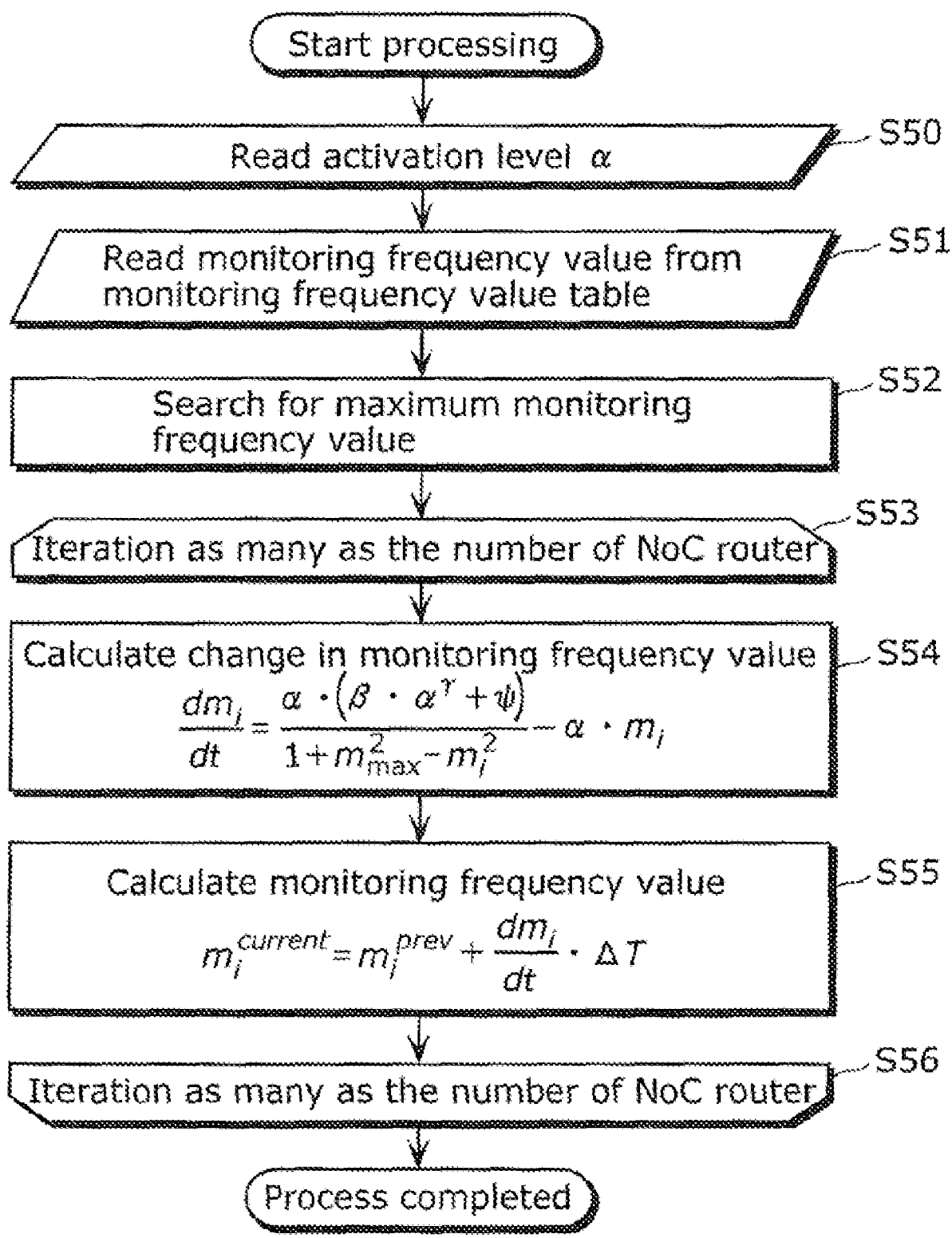
FIG. 21 is a flowchart illustrating an example of the process performed by a monitoring frequency value updating unit.

FIG. 21 is a flowchart illustrating an example of process performed by a monitoring frequency updating unit 110.

The monitoring frequency value updating unit 110 reads the activation level α determined by the activation level calculating unit 109 (S50), reads the monitoring frequency value $m_i$ from the monitoring frequency value table in the monitoring frequency value storage unit 111 (S51), and searches for the maximum value $m_{max}$ of the monitoring frequency value (S52).

The new monitoring frequency value for each NoC router is calculated using the activation level α that is read, the monitoring frequency value $m_i$, and the maximum monitoring frequency value $m_{max}$ (S53 to S56).

The following further describes the calculation of the monitoring frequency value.

Equation 5 is an example of the definition of the dynamics of the monitoring frequency value $m_i$, β, γ, and φ in the equation are constants for controlling the rate of change of the dynamics.

[Equation 5]

$$\frac{dm_i}{dt} = \frac{\alpha \cdot (\beta \cdot \alpha^\gamma + \varphi)}{1 + m_{max}^2 - m_i^2} - \alpha \cdot m_i \quad \text{(Equation 5)}$$

It is known that the steady-state solution of the nonlinear ordinary differential equation for the NoC router with the maximum updating frequency value is Equation 6.

[Equation 6]

$$m_i = \beta \cdot \alpha^\gamma + \varphi \quad \text{(Equation 6)}$$

Furthermore, the steady-state solution for the other NoC routers is Equation 7.

[Equation 7]

$$m_i = \frac{1}{2}\left[\sqrt{4 + (\beta \cdot \alpha^\gamma + \varphi)^2} - (\beta \cdot \alpha^\gamma + \varphi)\right] \quad \text{(Equation 7)}$$

The change in the monitoring frequency value $m_i$ is calculated according to Equation 5, and the monitoring frequency value is updated according to Equation 8, using the change in the calculated change in monitoring frequency value $m_i$.

Here, Δt denotes a time interval determined by the updating cycle.

[Equation 8]

$$m_i^{current} = m_i^{prev} + \frac{dm_i}{dt} \cdot \Delta T \quad \text{(Equation 8)}$$

The monitoring frequency value updating unit 110 updates the monitoring frequency value recorded on the monitoring frequency value table with the new monitoring frequency value $m_i$ calculated for each NoC router that is the candidate for monitoring.

(Selection Probability Value Generating Unit 112)

The selection probability value generating unit 112 generates the selection probability value which is random numbers used for stochastically selecting the NoC router to be monitored by the monitoring object selecting unit 113.

Although it is preferable that the selection probability values are random numbers, they may be substituted by pseudorandom numbers which can be generated relatively easily.

The probability distribution used in that case may be a general uniform distribution or Gaussian distribution.

The variation range of the selection probability value can be determined using Equation 6 and Equation 7.

When the activation level α is 0, the distance D between the solutions is represented by Equation 9.

[Equation 9]

$$D = 0.5 \cdot (1 - \sqrt{\varphi^2 + 4}) \quad \text{(Equation 9)}$$

With this, the selection probability value $\eta_i$ is determined as shown in Equation 10.

[Equation 10]

$$\eta_i = \text{Random}(i)[-0.25 \cdot (\kappa + 1 - \sqrt{\varphi^2+4}), +0.25 \cdot (\kappa + 1 - \sqrt{\varphi^2+4})] \quad \text{(Equation 10)}$$

Random function generates actual random numbers or pseudorandom numbers within a predetermined range, and K is the adjustment factor with the value equal to or more than 0.

Increasing K expands the amplitude of the selection probability value to be generated.

(Monitoring Object Selecting Unit 113)

Figure 22:
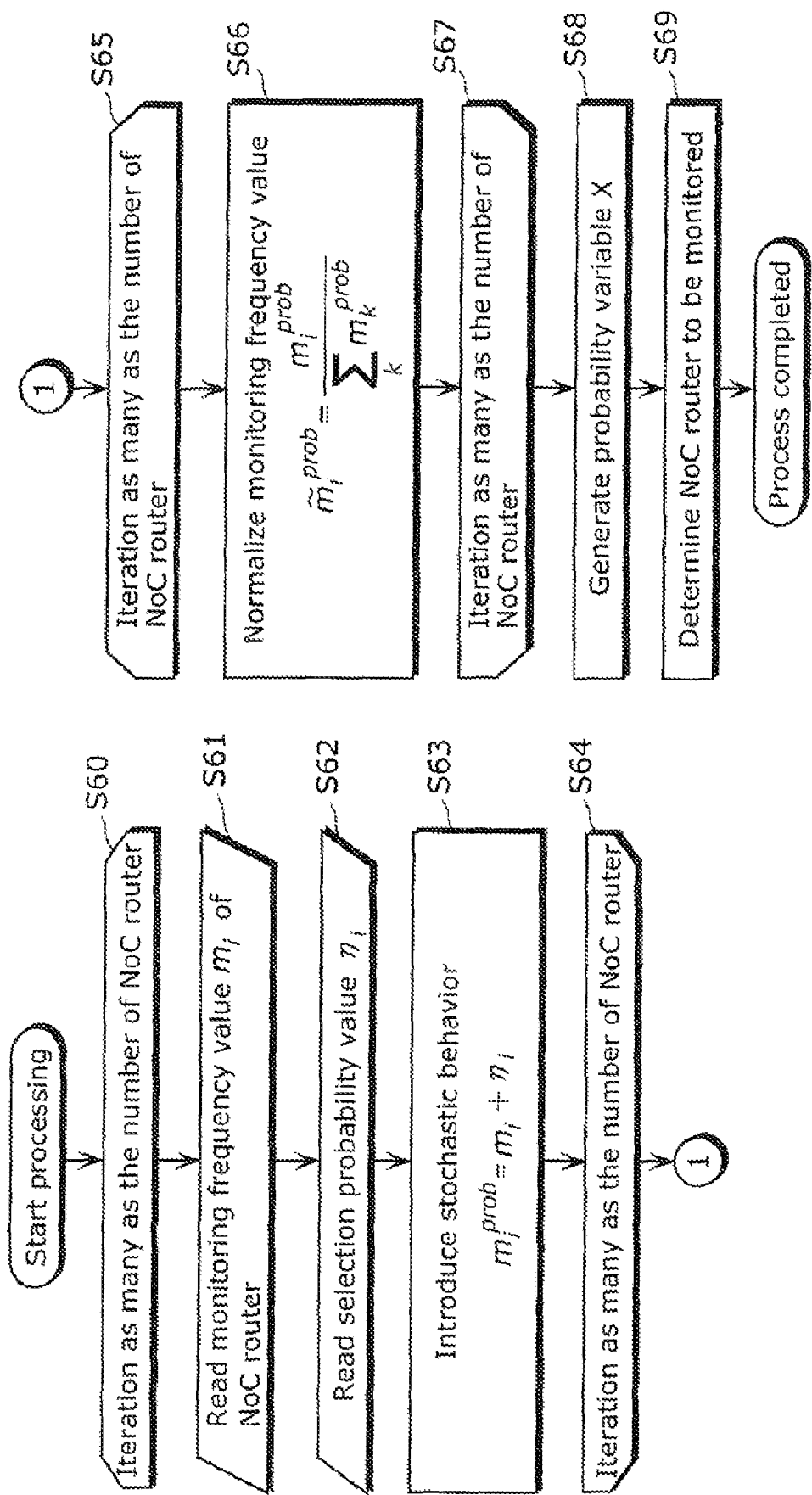
FIG. 22 is a flowchart illustrating an example of the process performed by a monitoring object selecting unit.

FIG. 22 is a flowchart illustrating an example of process performed by the monitoring object selecting unit 113.

The monitoring object selecting unit 113 reads the monitoring frequency value $m_i$ of each NoC router from the monitoring frequency value table managed by the monitoring frequency value storage unit 111, and stochastically selects the NoC router to be monitored by adding the selection probability value $\eta_i$ of the corresponding NoC router generated by the selection probability value generating unit 112 to the monitoring frequency $m_i$, as shown in Equation 11 (S60 to S64)

[Equation 11]

$$m_i^{prob} = m_i + \eta_i \quad \text{(Equation 11)}$$

The monitoring frequency of each NoC router that is updated is normalized using Equation 12 to derive a probability value (S65 to S67).

[Equation 12]

$$\tilde{m}_i^{prob} = \frac{m_i^{prob}}{\sum_k m_k^{prob}} \quad \text{(Equation 12)}$$

FIG. 23 illustrates an example of data structure of the normalized monitoring frequency value table that records the normalized monitoring frequency value operated as described above.

The normalized monitoring frequency value table records the identification numbers of the NoC routers in the first column, the addresses of the NoC routers in the second column, and the normalized monitoring frequency values calculated using Equation 12 in the third column.

The monitoring object selecting unit 113 considers the index of the NoC router to be selected as the probability variable by seeing the normalized monitoring frequency value as the probability distribution for the index of each NoC router, and selects the NoC router to be monitored according to the value of the probability variable.

With the above-described operations, the selected NoC router is monitored according to the monitoring frequency value. Thus, compared to the case where all NoC routers on the path are constantly monitored, the resources required for monitoring are saved, allowing effective monitoring even in a narrowband network.

In addition, malfunctions are predicted using the number of flows relayed by the NoC router as the malfunction occurrence probability value. Thus, compared to the conventional method that detects malfunction by referring to the statistic reflecting the fact that the malfunction is actually occurring, such as the number of retry, the value indicating load on the line, and the amount of traffic, it is possible to detect the malfunction early, before the malfunction reflected on the statistics actually occur.

This is because the invention according to this embodiment predicts a malfunction, by using the number of specific flows relayed by the NoC router as the malfunction occurrence probability value.

(Detail of Bypass Path Selection)

The bypass path selection by the bypass path selecting unit 304 shall be described as follows in detail.

Figure 24:
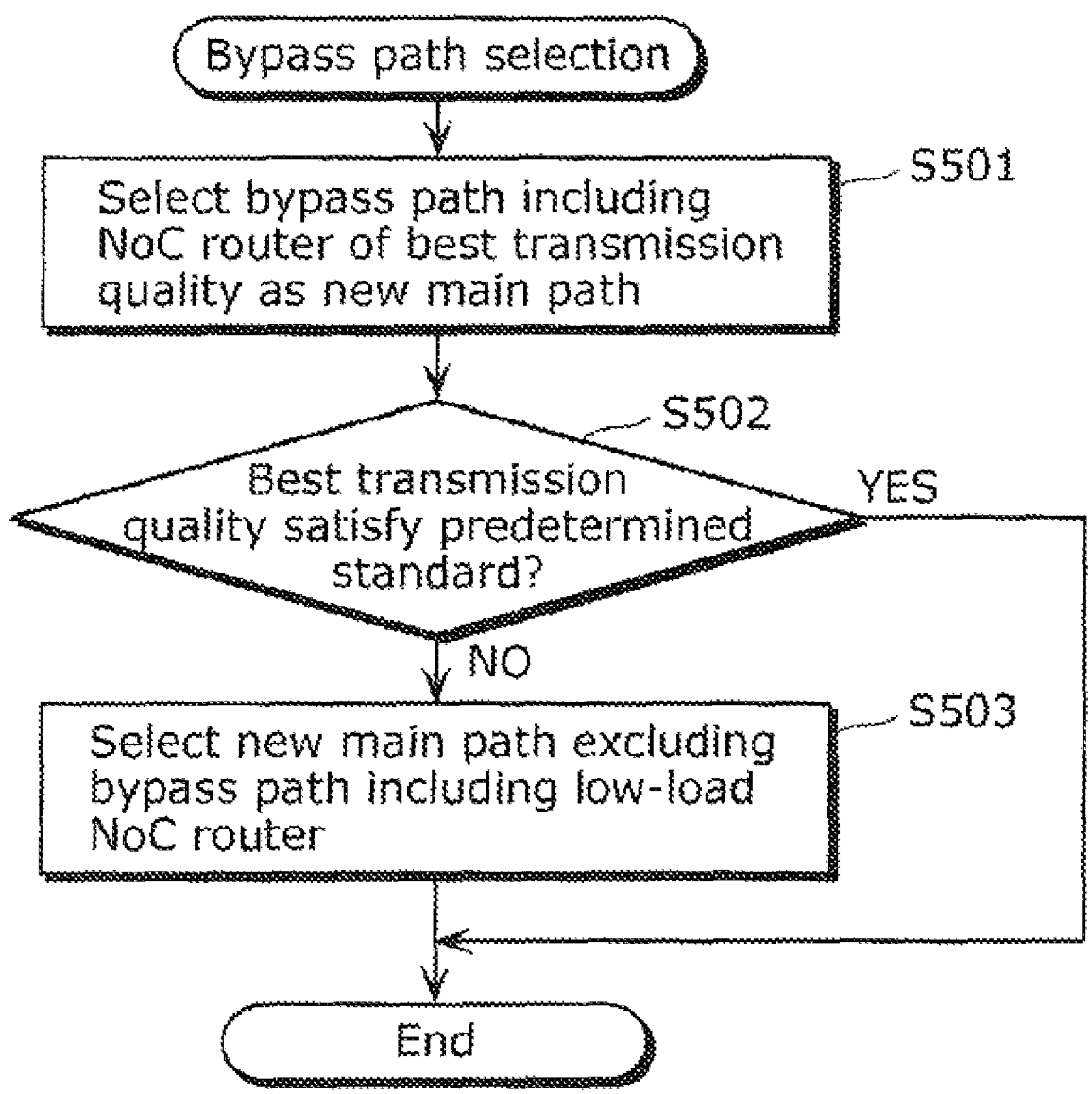
FIG. 24 is a flowchart illustrating an example of bypass path selecting process.

FIG. 24 is a flowchart illustrating an example of process performed by the bypass path selecting unit 304.

This process is performed when the bypass path selecting unit 304 receives a notification from the path malfunction predicting unit 303 that the malfunction on the main path is predicted.

Prior to this process, the bypass path selecting unit 304 measures the transmission quality value (for example, the loss rate, delay time, and jitter value) indicating the transmission quality of the NoC router selected as the NoC router to be monitored by the path malfunction predicting unit 303. The bypass path selecting unit 304 obtains the load value (for example, buffer usage rate) indicating the level of load in the NoC router from the NoC router, and stores the transmission quality value and the load value for each NoC router using a table that is not illustrated.

When receiving the notification from the path malfunction predicting unit 303 indicating that the malfunction on the main path is predicted, the bypass path selecting unit 304 selects a bypass path to be a new main path, using the transmission quality values and the load values stored therein.

More specifically, the path is selected as follows.

The bypass path selecting unit 304 refers to the transmission quality value stored for the NoC routers in each bypass paths, and selects a bypass path including a NoC router with the highest transmission quality indicated by the transmission quality value as a new main path (S501). The NoC router with highest transmission quality is, for example, a router with the least transmission delay.

However, when the highest transmission quality does not satisfy the predetermined standard (No in S502), the bypass path selecting unit 304 refers to the load value stored for each NoC router, and re-selects a new main path from the bypass paths except the bypass path including the NoC router with low load (S503). Here, the best transmission quality does not satisfy the predetermined standard, when, for example, the lowest loss rate is equal to or higher than the predetermined threshold. In addition, the NoC router with low load is, for example, an NoC router with the buffer usage rate less than the predetermined threshold.

Note that, the description above is the example in which the measurement results such as the delay time, jitter value are used as the transmission quality value. However, instead of measuring these values, the bypass path selecting unit 304 may use the level of temporal change in the malfunction occurrence probability value as the transmission quality value. Here, the malfunction occurrence probability value is the intersecting flow count and transmission bandgap count.

This is because it is assumed that in the NoC router in which the intersecting flow count and the transmission bandgap frequently change, the transmission quality changes greatly and as a result it would be difficult to maintain a desired transmission quality stably.

The level of temporal change in the malfunction occurrence probability value may be represented, for example, by a variance value of the malfunction occurrence probability values obtained from one NoC router within a predetermined period, for example.

Furthermore, although the description above describes an example in which one new path is selected by the bypass path selecting unit 304 when a malfunction on the main path is predicted by the path malfunction predicting unit 303, the process that should be taken by the bypass path selecting unit 304 is not limited to this example.

For example, in a semiconductor system in which multi-path transmission from the transmission bus master to the reception bus master is performed, the bypass path selecting unit 304 may assign data amount to be transmitted through each path composing the multi-path. For example, more data amount is assigned to a path with high transmission quality than the path with low transmission quality.

Furthermore, data may be sorted for each path (for example, highly important data such as control signals is transmitted through the path with highest transmission quality).

Application Example 1

The following describes an example of the application of the best path selecting method according to the present invention.

Figure 25:
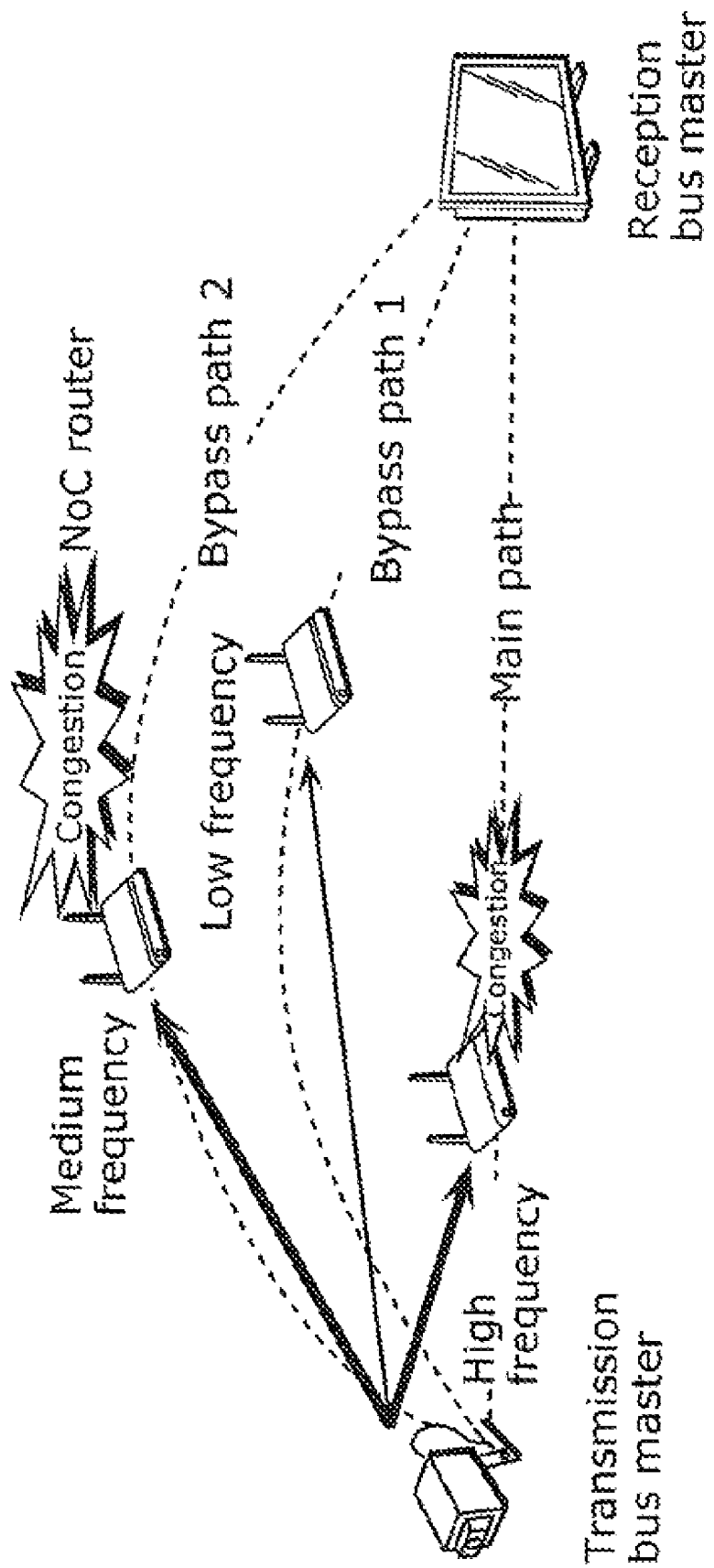
FIG. 25 is a schematic diagram illustrating an example of specific structure of the semiconductor system to which the best path selecting method according to the present invention is applied.

FIG. 25 is a schematic diagram illustrating an example of specific structure of the semiconductor system to which the path control method according to the present invention is applied.

In FIG. 25, it is assumed that the bus master 300 inquires the NoC router 200 of the malfunction occurrence probability value.

In the example in FIG. 25, one main path and two bypass paths are illustrated from a processor which is the transmission bus master, and to the processor which is the reception bus master.

In addition, one NoC router that is a candidate for monitoring is illustrated for each path.

In the example in FIG. 25, the NoC router which is indicated by the malfunction occurrence probability value collected from the NoC routers that are candidates for monitoring as likely to have malfunction is selected to be the NoC router to be monitored highly frequently, whereas the NoC router indicated as less likely to have malfunctions is selected as the NoC router to be monitored at low frequency.

New malfunction occurrence probability value and the transmission quality value of the NoC router selected as the NoC router to be monitored are collected. Subsequently, attempts for preventing malfunction in advance is made by predicting malfunctions on the main path using the collected malfunction occurrence probability value and the transmission quality value, and by selecting a bypass path to be a new main path.

It is reasonable to monitor the NoC router with higher probability of malfunction at higher frequency for accurately predicting the malfunction in the limited number of monitoring operations through these operations.

This allows limiting the number of monitoring operations and precisely predicting malfunctions. Thus, even when the bypass path increases or when there are many NoC routers as the candidates for monitoring, it is possible to accurately figure out the status of the NoC router using small amount of observation flits. Therefore, it is possible to contribute to lower electric consumption and reduced semiconductor system load due to the observation flits.

Note that, under certain conditions, collection of the malfunction occurrence probability values from the NoC routers and update of the monitoring frequency values may be stopped.

For example, in the communication method in which the transmission path and the transmission band are reserved, the intersecting flow count does not change until the communication ends. Thus, collection of the malfunction occurrence probability values from the NoC routers and update of the monitoring frequency values may be stopped, and the NoC router to be monitored may be fixed.

Application Example 2

The following describes an example of the application of the path control method according to the present invention.

Figure 26:
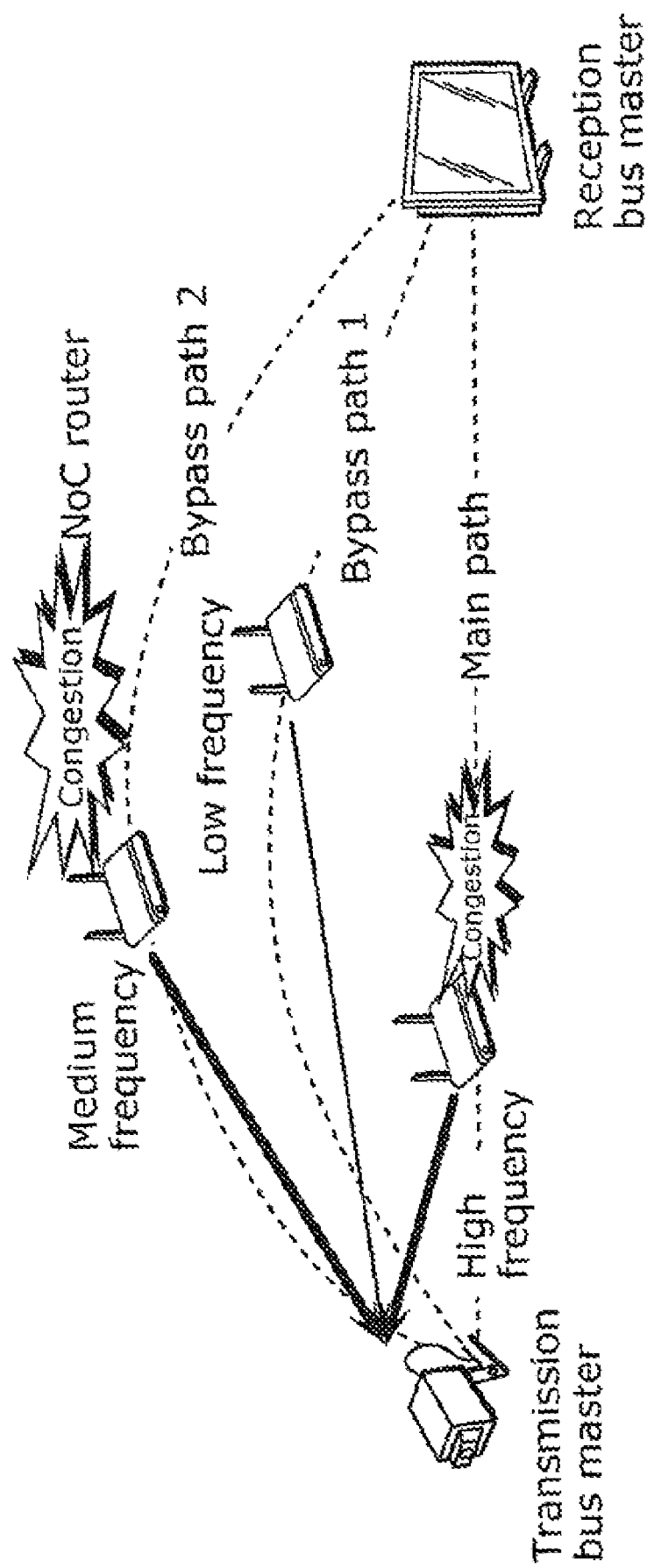
FIG. 26 is a schematic diagram illustrating another example of specific structure of the semiconductor system to which the best path selecting method according to the present invention is applied.

FIG. 26 is a schematic diagram illustrating an example of specific structure of the semiconductor system to which the path control method according to the present invention is applied.

In FIG. 26, the method by the NoC router to automatically notify the bus master of the malfunction occurrence probability value.

In the example in FIG. 26, one main path and two bypass paths are illustrated from the camera, the transmission bus master, and to the processor, the reception bus master.

In addition, one NoC router that is a candidate for monitoring is illustrated for each path.

FIG. 26, the NoC router which is indicated by the malfunction occurrence probability value as likely to have malfunction notifies the bus master of the malfunction occurrence probability value and the transmission quality value highly frequently. The NoC router indicated as less likely to have malfunctions notifies the bus master of the malfunction occurrence probability value and the transmission quality value at low frequency.

New malfunction occurrence probability value and the transmission quality value of the NoC router selected as the NoC router to be monitored are collected. Subsequently, attempts for preventing malfunction in advance is made by predicting malfunctions on the main path using the notified malfunction occurrence probability value and the transmission quality value, and by selecting a bypass path to be a new main path.

It is reasonable to monitor the NoC router with higher probability of malfunction at higher frequency for accurately predicting the malfunction in the limited number of monitoring operations through these operations.

This allows limiting the number of monitoring operations and precisely predicting malfunctions. Thus, even when the bypass path increases or when there are many NoC routers as the candidates for monitoring, it is possible to accurately figure out the status of the NoC router using small amount of observation flits, and thus it is possible to contribute to lower electric consumption and reduced semiconductor system load due to the observation flits.

(Variation of Path Control According to the Size of Malfunction)

The following describes a variation in which path control is performed according to the size of malfunction in the semiconductor system.

Figure 27:
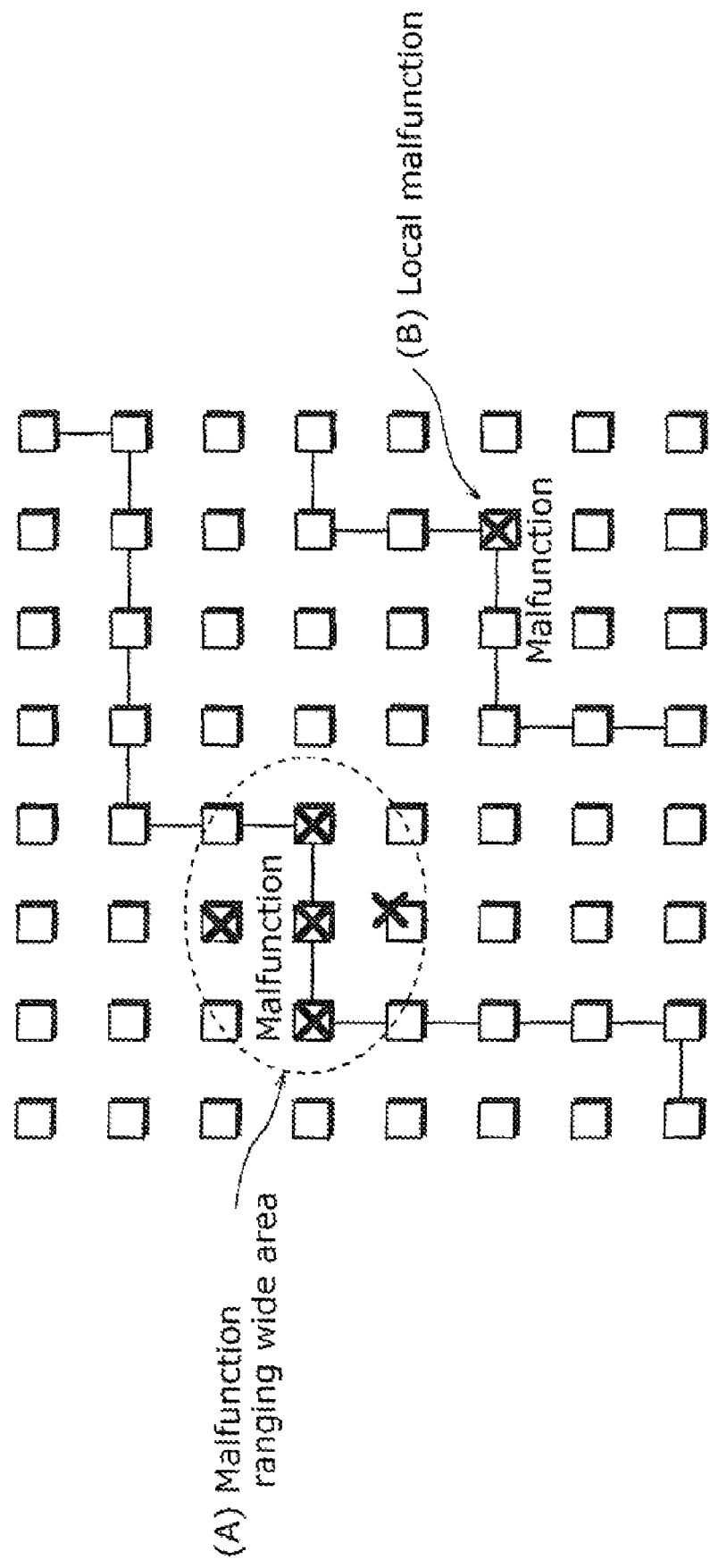
FIG. 27 illustrates how the malfunction occurs in the semiconductor system.

FIG. 27 illustrates how malfunction occurs in the semiconductor system.

Malfunctions include a case where the malfunction occurs widely on a NoC router on the path and a number of neighboring NoC routers (FIG. 27(A)), and a case where the malfunction occurs locally only on the NoC router on the path (FIG. 27(B)).

When the malfunction occurs locally, no bypassing is performed in anticipation of recovery in a short time, and bypassing is performed only when the size of malfunction is large. This allows suppressing the degradation on the transmission performance caused by frequent bypassing.

Figure 28:
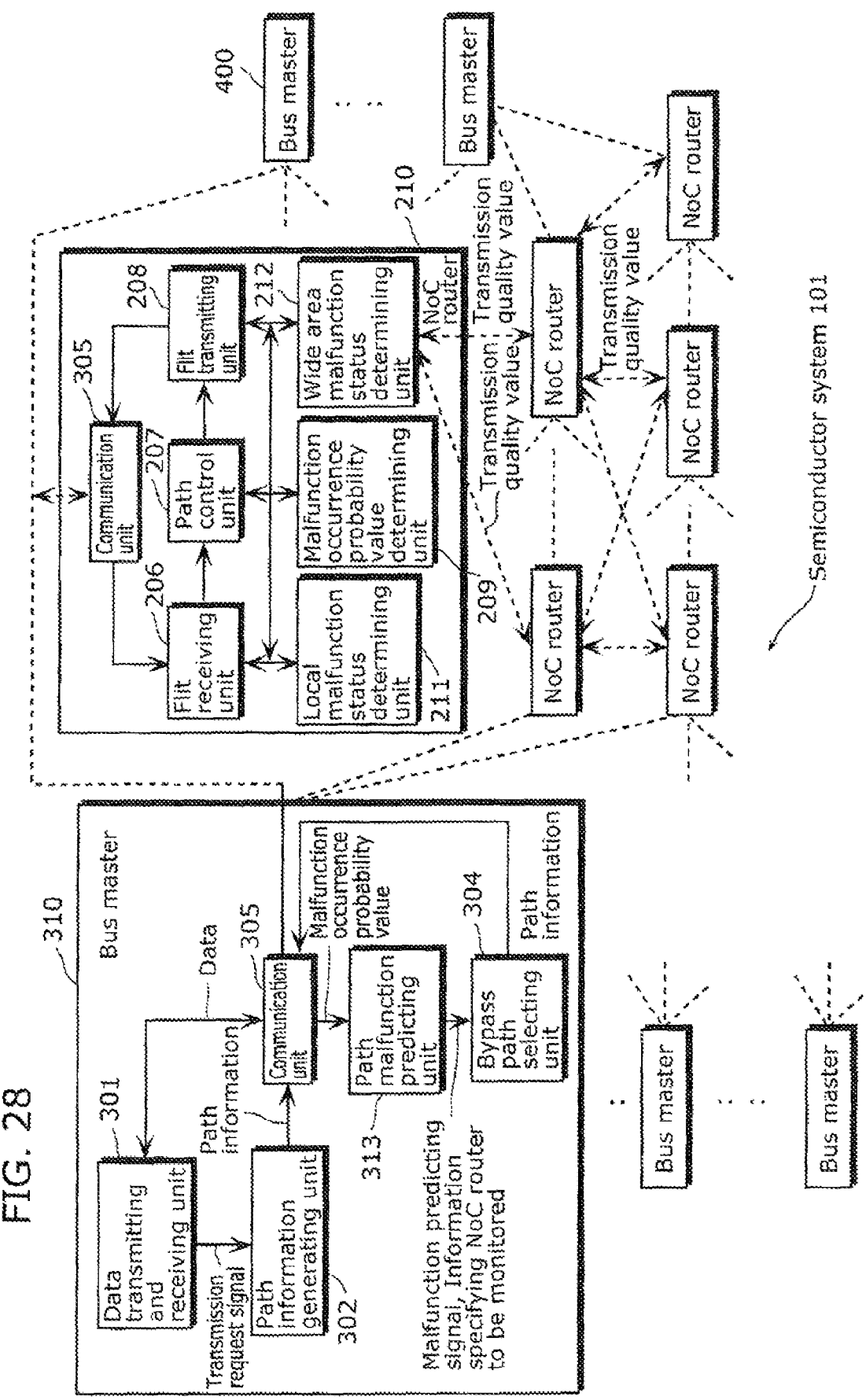
FIG. 28 illustrates an example of the configuration of the semiconductor system according to the variation of the present invention.
Figure 29:
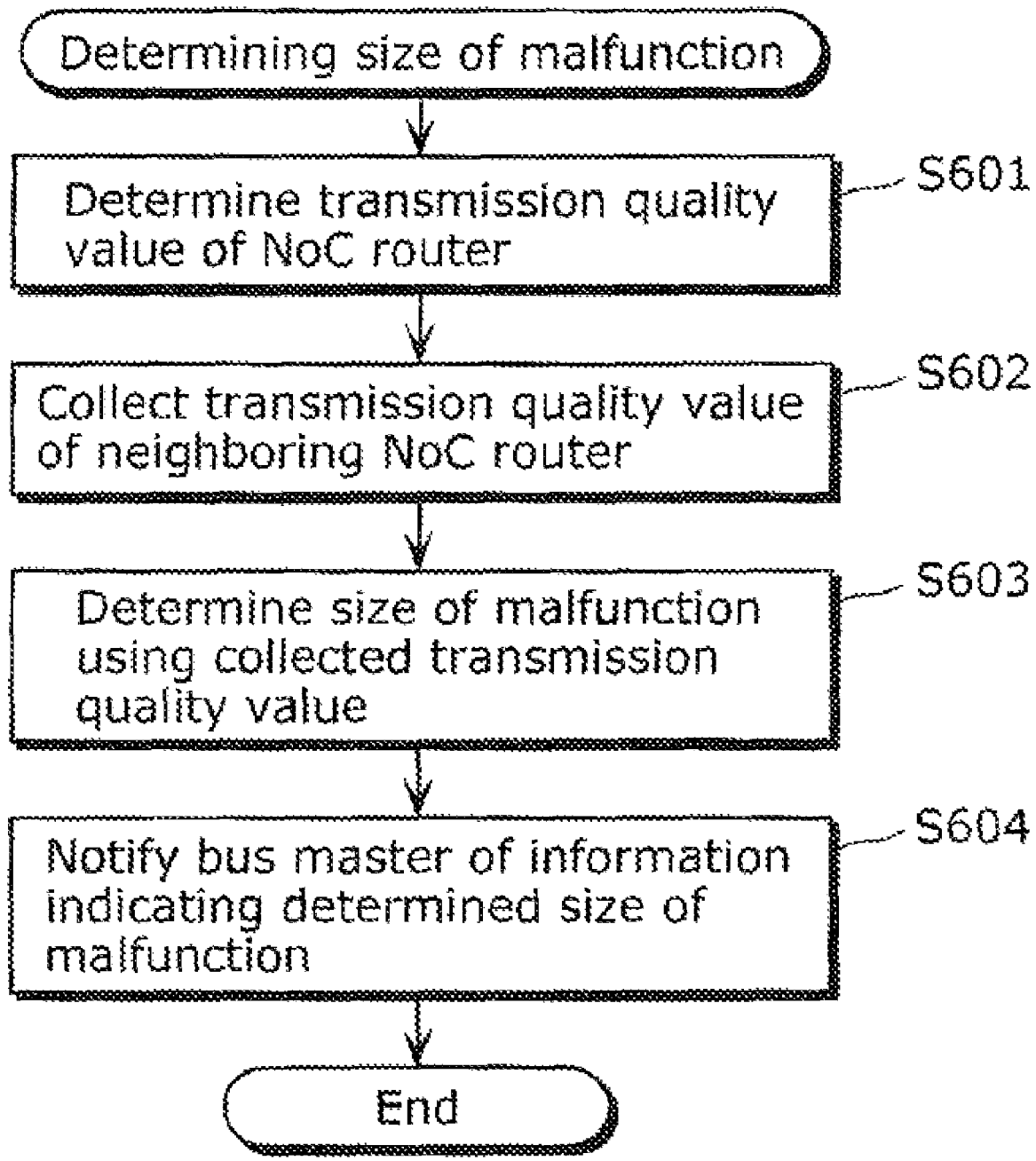
FIG. 29 is a flowchart Illustrating an exemplary operation for determining the size of the malfunction.

FIGS. 28 and 29 specifically describe a semiconductor system which control paths according to the size of malfunction.

FIG. 28 is a block diagram illustrating an example of the configuration of the semiconductor system 101 which determines the size of malfunction and controls paths according to the size of determined malfunction.

The NoC router 210 in the semiconductor system 101 includes a local malfunction status determining unit 211 and a wide area malfunction status determining unit 212, in addition to the components of the NoC router 200 in the semiconductor system 100 in FIG. 5.

The local malfunction status determining unit 211 determines the level of congestion or transmission error in the NoC router 210, and holds information indicating the result of the determination.

The information indicating the level of the congestion is, for example, the buffer usage rate in the NoC router 210, and the measurement results such as the delay time, for example.

The wide area malfunction status determining unit 212 collects information regarding the level of congestion or transmission error from the other NoC routers within a predetermined hop count from the NoC router 210, and determines whether or not the congestion or transmission error occur widely, using the collected information.

The bus master 310 in the semiconductor system 101 includes, compared to the bus master 300 in the semiconductor system 100 in FIG. 5, the path malfunction predicting unit 313 instead of the path malfunction predicting unit 303.

The path malfunction predicting unit 313 is similar to the path malfunction predicting unit 303 in that the malfunction on the main path is predicted using the malfunction occurrence probability value. However, the path malfunction predicting unit 313 differs from the path malfunction predicting unit 303 in that the malfunction size information indicating the size of malfunction is collected from the NoC router, and the malfunction size information is used for determining whether or not bypassing is necessary, together with the malfunction occurrence probability value.

When the malfunction is predicted by the malfunction occurrence probability value collected by the NoC router on the main path, the path malfunction predicting unit 313 inquires the NoC router to obtain the malfunction size information indicating the size of malfunction occurring around the NoC router, the malfunction of which is predicted, to obtain the malfunction size information indicating the size of the malfunction occurring around the NoC router.

Subsequently, when the size of malfunction indicated by the malfunction size information is small, the path malfunction predicting unit 313 prevents bypassing.

The operations of the NoC router 210 with the abovementioned configuration shall be described in detail focusing on the difference from the operations of the NoC router 200 described above.

FIG. 29 is a flowchart illustrating an exemplary operation for determining the size of the malfunction, performed by the NoC router 210.

Note that, the NoC router 210 performs processes similar to the process by the NoC router 200 (see FIG. 8), and performs process illustrated in FIG. 29.

The description for the process similar to that of the NoC router 200 is omitted here.

The local malfunction status determining unit 211 measures the delay time and others of the flit in the flit receiving unit 206 and the flit transmitting unit 208, as information regarding the congestion status and the transmission error in the NoC router 210 (S601).

The wide area malfunction status determining unit 212 collects information regarding the congestion status or transmission error measured by the other NoC routers within a predetermined hop count from the NoC router 210 (S602).

More specifically, the wide area malfunction status determining unit 212 may collect the information to be notified from the other NoC routers by transmitting inquiry flit to the other NoC routers.

The wide area malfunction status determining unit 212 determines whether or not the congestion or transmission error occurs in a wide area, using the collected information (S603).

The wide area malfunction status determining unit 212 simply determines the number of NoC routers in which the degradation of the transmission error rate, loss rate, and delay time (for example, exceeding the predetermined threshold value), according to the collected information, as the size of malfunction, for example.

Furthermore, the wide area malfunction status determining unit 212 may specify until how many hops away from the NoC router 210 the NoC router has successive degradation in the transmission rate, loss rate, and the delay time, and determine the hop count as the size of malfunction.

Furthermore, the wide area malfunction status determining unit 212 may define the collected sum of degrees of degradation in delay time as the level of malfunction, and determines the multiplication of the hop count and the intensity of the malfunction as the size of malfunction. For example, the amount exceeding the predetermined threshold may be the degrees of the degradation in collected delay time of each NoC router.

The wide area malfunction status determining unit 212 notifies the bus master 310 of the malfunction size information indicating the determined size of malfunction, in response to the inquiry from the bus master 310 (S604).

The path malfunction predicting unit 313 in the bus master 310 determines whether or not bypassing is necessary using the malfunction size information indicating the size of malfunction, which is notified as described above, together with the malfunction occurrence probability value.

For example, suppose the malfunction size information notified from the NoC router on the main path is a value indicating until how many hops away the NoC router has successive congestion or transmission error. When the value is 0, the path malfunction predicting unit 313 determines that no malfunction is occurring, or even if there is malfunction, short-term recovery is expected because the malfunction is limited to the NoC router on the main path, and does not instruct the bypass path selecting unit 304 to bypass the path.

On the other hand, when the above-described value is 1 or more, the path malfunction predicting unit 313 determines that the malfunction ranging wide area is occurring around the NoC router on the main path and the recovery is not expected. Subsequently, the path malfunction predicting unit 313 instructs the bypass path selecting unit 304 to perform bypassing.

Note that, the malfunction size information notified from the NoC router on the main path may not only be used for determining whether or not the bypassing is necessary, but also for selecting the bypass path that should be a new main path.

More specifically, when the malfunction size information notified from the NoC router on the main path indicates the wide malfunction around the NoC router on the main path, the bypass path selecting unit 304 selects a path with the largest hop count among the bypass paths.

Such a bypass path is highly likely to be away from the main path. Thus, the bypass path less subject to the malfunction occurring around the NoC router on the main path is likely to be selected as a new main path.

As described above, the path control device according to the present invention predicts malfunction on the NoC router using the flow count to be relayed by the NoC router as the malfunction occurrence probability value, excluding the path including the NoC router whose malfunction is predicted, and selects a new path that should be used for transmitting data. With this, it is possible to perform quick bypassing before the degradation on the transmission quality or the increase on the load that would be reflected on the predetermined statistics actually occurs.

Furthermore, the malfunction occurrence probability value is collected from the NoC router stochastically selected according to the monitoring frequency in accordance with the probability of the malfunction. Thus, it is possible to limit the monitoring cost (amount of monitoring flits, consumption power, time necessary for observation), and to stochastically avoid overlooking malfunction.

Although the best path selecting device and the best path selecting method have been described, it should be noted that although the present invention is described based on aforementioned embodiment, the present invention is obviously not limited to such embodiment.

For example, part of, or all of the aforementioned apparatuses may be a computer system including a microprocessor, a ROM, a RAM, and so on. A computer program is stored in the RAM. The respective apparatuses achieve their functions through the microprocessor's operation according to the computer program.

Alternatively, the present invention may be a computer system including a microprocessor and a memory. The memory may store the computer program, and the microprocessor may operate according to the computer program. Needless to say, the program may be distributed via a non-volatile recording medium such as CD-ROM and a communication network such as the Internet.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The best path selecting device according to the present invention is applicable to the network transmission system on a system LSI.

REFERENCE SIGNS LIST 100, 101 Semiconductor system
106 Malfunction occurrence probability value obtaining unit
107 Malfunction occurrence probability value storage unit
109 Activation level calculating unit
110 Monitoring frequency value updating unit
111 Monitoring frequency value storage unit
112 Selection probability value generating unit
113 Monitoring object selecting unit
200, 210, 220 NoC router
206 Flit receiving unit
207 Path control unit
208 Flit transmission unit
209, 229 Malfunction occurrence probability value determining unit
211 Local malfunction status determining unit
212 Wide area malfunction status determining unit
300, 310, 320, 400 Bus master
301 Data transmitting and receiving unit
302 Path information generating unit
303 Path malfunction predicting unit
304 Bypass path selecting unit
305 Communication unit
313 Path malfunction predicting unit
331 Bus receiving unit
332 Flit interpreting unit
333 Core transmitting unit
334 Core receiving unit
335 Flit generating unit
336 Core transmitting unit
337 Bus clock control unit

The invention claimed is:

1. A path selecting device which selects a path, from among a plurality of paths for transmitting data from a transmission bus master to a reception bus master through NoC (Network-on-Chip) routers located on the plurality of paths, said path selecting device comprising:

a path information generating unit configured to generate path information identifying each path of the plurality of paths for transmitting the data from the transmission bus master to the reception bus master, each path identified by the generated path information including at least one NoC router, of the NoC routers, determined to be a candidate for monitoring;

a path malfunction predicting unit configured to (i) collect, for each respective NoC router determined to be the candidate for monitoring, a number of flows as a malfunction occurrence probability value representing a likelihood of a malfunction on the respective NoC router, the malfunction including a degradation in transmission quality and an increase in load of the respective NoC router, and each flow of the flows collected for each respective NoC router determined to be the candidate for monitoring being a sequence of one or more flits to be transmitted from a predetermined transmission source to a predetermined destination by the respective NoC router determined to be the candidate for monitoring, and (ii) predict the malfunction on each respective NoC router determined to be the candidate for monitoring, using the collected malfunction occurrence probability value; and a bypass path selecting unit configured to (i), when said path malfunction predicting unit predicts the malfunction on the at least one NoC router that is determined to be the candidate for monitoring on one of the paths identified by the generated path information, exclude the path including the NoC router for which the malfunction is predicted, and (ii) select, from among the paths identified by the generated path information, a path other than the excluded path to be used for transmitting the data from the transmission bus master to the reception bus master.

2. The path selecting device according to claim 1, wherein said path malfunction predicting unit is configured to collect, as the malfunction occurrence probability value, the number of flows relayed by each NoC router of the NoC routers except for a flow from the transmission bus master to the reception bus master.

3. The path selecting device according to claim 1, wherein said path malfunction predicting unit is configured to collect, as the malfunction occurrence probability value, the number of flows, each of which is with a transmission band on a network for transmission narrower than a transmission band on a network for reception, the number of flows being collected from among flows relayed by each NoC router of the NoC routers.

4. The path selecting device according to claim 1, wherein said path malfunction predicting unit includes:

a monitoring frequency value storage unit configured to store a monitoring frequency value indicating a frequency for monitoring the malfunction occurrence probability value of each respective NoC router determined to be the candidate for monitoring;

a selection probability value generating unit configured to generate a selection probability value which is a predetermined probability value for each NoC router of the NoC routers;

a monitoring object selecting unit configured to select, from the NoC routers, an NoC router having a malfunction occurrence probability that is to be monitored, according to the monitoring frequency value and the selection probability value;

a malfunction occurrence probability value obtaining unit configured to obtain the malfunction occurrence probability value from the NoC router selected by said monitoring object selecting unit;

a malfunction occurrence probability value storage unit configured to store the obtained malfunction occurrence probability value;

an activation level calculating unit configured to calculate, using the stored malfunction occurrence probability value, an activation level indicating a validity of the monitoring frequency value stored in said monitoring frequency value storage unit; and a monitoring frequency value updating unit configured to update the monitoring frequency value stored in said monitoring frequency value storage unit, based on the activation level.

5. The path selecting device according to claim 1, wherein said bypass path selecting unit is configured to determine a transmission quality value indicating the transmission quality of each respective NoC router determined to be the candidate for monitoring, and wherein said bypass path selecting unit is configured to select, from among the plurality of paths excluding a path including an NoC router of the NoC routers which has the transmission quality below a predetermined standard, a path that should be used for transmitting the data from the transmission bus master to the reception bus master, the transmission quality being indicated by the determined transmission quality value.

6. The path selecting device according to claim 5, wherein said bypass path selecting unit is configured to collect a load value indicating a level of the load on each respective NoC router determined to be the candidate for monitoring, and wherein said bypass path selecting unit is configured to select, from among the plurality of paths excluding a path including a NoC router of the NoC routers which has the level of the load below a predetermined standard, a path that should be used for transmitting the data from the transmission bus master to the reception bus master, the level of the load being indicated by the collected load value.

7. The path selecting device according to claim 1, wherein, when the malfunction is predicted on the at least one NoC router determined to be the candidate for monitoring, said bypass path selecting unit is configured to obtain malfunction size information indicating a size of malfunction occurring around the NoC router on which the malfunction is predicted, and configured not to exclude, from the selection of the path for transmitting the data from the transmission bus master to the reception bus master, a path including an NoC router of the NoC routers which has the size of malfunction indicated by the obtained malfunction size information below a predetermined standard.

8. The path selecting device according to claim 1, wherein said path selecting device is provided on the transmission bus master or one NoC router of the NoC routers included in a semiconductor system.

9. A path selecting device which controls a path, from among a plurality of paths for transmitting data from a transmission bus master to a reception bus master through NoC (Network-on-Chip) routers located on the plurality of paths, wherein each respective NoC router of the NoC routers includes:

a path malfunction detecting unit configured to (i) calculate, for the respective NoC router, a number of flows, each flow of the flows being a sequence of one or more flits to be transmitted from a predetermined transmission source to a predetermined destination, the calculated number of flows being calculated as a malfunction occurrence probability value representing a likelihood of a malfunction on the respective NoC router, the malfunction including a degradation in transmission quality and an increase in load of the respective NoC router, and (ii) notify said path selecting device of the malfunction occurrence probability value when the malfunction occurrence probability value exceeds a predetermined threshold, and wherein said path selecting device comprises:

a path information generating unit configured to generate path information identifying each path of the plurality of paths for transmitting the data from the transmission bus master to the reception bus master, each path identified by the generated path information including at least one NoC router, of the NoC routers, determined to be a candidate for monitoring; and a bypass path selecting unit configured to (i), when a malfunction is predicted on the at least one NoC router that is determined to be the candidate for monitoring using the malfunction occurrence probability value, exclude the path including the NoC router for which the malfunction is predicted, and (ii) select, from among the paths identified by the generated path information, a path other than the excluded path to be used for transmitting the data from the transmission bus master to the reception bus master.

10. A path selecting method for selecting, via a path selecting device, a path, from among a plurality of paths for transmitting data from a transmission bus master to a reception bus master in a semiconductor system in which NoC (Network-on-Chip) routers located on the plurality of paths are mutually connected through a network, said path selecting method comprising:

generating path information identifying each path of the plurality of paths for transmitting the data from the transmission bus master to the reception bus master, each path identified by the generated path information including at least one NoC router, of the NoC routers, determined to be a candidate for monitoring;

collecting, for each respective NoC router determined to be the candidate for monitoring, a number of flows as a malfunction occurrence probability value representing a likelihood of a malfunction on the respective NoC router, the malfunction including a degradation in transmission quality and an increase in load of the respective NoC router, and each flow of the flows collected for each respective NoC router determined to be the candidate for monitoring being a sequence of one or more flits to be transmitted from a predetermined transmission source to a predetermined destination by the respective NoC router determined to be the candidate for monitoring;

predicting the malfunction on each respective NoC router determined to be the candidate for monitoring, using the collected malfunction occurrence probability value;

excluding, when said predicting predicts the malfunction on the at least one NoC router that is determined to be the candidate for monitoring one of the paths identified by the generated path information, the path including the NoC router for which the malfunction is predicted; and selecting, from among the paths identified by the generated path information, a path other than the excluded path to be used for transmitting the data from the transmission bus master to the reception bus master.

11. A non-transitory computer-readable recording medium having a computer program recorded thereon, the computer program for selecting a path, from among a plurality of paths for transmitting data from a transmission bus master to a reception bus master in a semiconductor system in which NoC (Network-on-Chip) routers located on the plurality of paths are mutually connected though a network, said computer program causing a computer to execute a method comprising:

generating path information identifying each path of the plurality of paths for transmitting the data from the transmission bus master to the reception bus master, each path identified by the generated path information including at least one NoC router, of the NoC routers, determined to be a candidate for monitoring;

collecting, for each respective NoC router determined to be the candidate for monitoring, a number of flows as a malfunction occurrence probability value representing a likelihood of a malfunction on the respective NoC router, the malfunction including a degradation in transmission quality and an increase in load of the respective NoC router, and each flow of the flows collected for each respective NoC router determined to be the candidate for monitoring being a sequence of one or more flits to be transmitted from a predetermined transmission source to a predetermined destination by the respective NoC router determined to be the candidate for monitoring;

predicting the malfunction on each respective NoC router determined to be the candidate for monitoring, using the collected malfunction occurrence probability value;

excluding, when said predicting predicts the malfunction on the at least one NoC router that is determined to be the candidate for monitoring one of the paths identified by the generated path information, the path including the NoC router for which the malfunction is predicted; and selecting, from among the path identified by the generated path information, a path other than the excluded path to be used for transmitting the data from the transmission bus master to the reception bus master.

12. A device which predicts a malfunction on a path, from among a plurality of paths for transmitting data from a transmission bus master to a reception bus master through NoC (Network-on-Chip) routers located on the plurality of paths, said device comprising:

a path information generating unit configured to generate path information identifying each path of the plurality of paths for transmitting the data from the transmission bus master to the reception bus master, each path identified by the generated path information including at least one NoC router, of the NoC routers, determined to be a candidate for monitoring; and a path malfunction predicting unit configured to predict a malfunction on each respective NoC router determined to be the candidate for monitoring, using, for each respective NoC router determined to be the candidate for monitoring, a number of flows as a scale for an occurrence of a malfunction on the respective NoC router, each flow of the flows being a sequence of one or more flits to be transmitted from a predetermined transmission source to a predetermined destination by the respective NoC router determined to be the candidate for monitoring, wherein, when the malfunction is predicted on the at least one NoC router that is determined to be the candidate for monitoring using a malfunction occurrence probability value, the path including the NoC router for which the malfunction is predicted is to be excluded from being used for transmitting the data from the transmission bus master to the reception bus master.

* * * * *